(12) United States Patent
Lackner et al.

(10) Patent No.: US 11,182,537 B2
(45) Date of Patent: *Nov. 23, 2021

(54) METHOD AND SYSTEM FOR REAL-USER CAPABLE DETECTING OF THE VISUAL COMPLETENESS OF BROWSER RENDERING PROCESSES

(71) Applicant: Dynatrace LLC, Waltham, MA (US)

(72) Inventors: Bernhard Lackner, Goldwörth (AT); Markus Wagner, Linz (AT); Simon Schatka, Linz (AT)

(73) Assignee: Dynatrace LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/950,507

(22) Filed: Nov. 17, 2020

(65) Prior Publication Data
US 2021/0089424 A1     Mar. 25, 2021

Related U.S. Application Data

(63) Continuation of application No. 16/196,308, filed on Nov. 20, 2018, now Pat. No. 10,846,193.

(60) Provisional application No. 62/593,429, filed on Dec. 1, 2017.

(51) Int. Cl.
| | |
|---|---|
| G06F 17/00 | (2019.01) |
| G06F 40/143 | (2020.01) |
| G06F 11/34 | (2006.01) |
| G06F 11/30 | (2006.01) |
| G06F 40/197 | (2020.01) |
| G06F 40/14 | (2020.01) |

(52) U.S. Cl.
CPC ........ *G06F 40/143* (2020.01); *G06F 11/3006* (2013.01); *G06F 11/3438* (2013.01); *G06F 40/14* (2020.01); *G06F 40/197* (2020.01)

(58) Field of Classification Search
None
See application file for complete search history.

(56) References Cited

U.S. PATENT DOCUMENTS

| | | | | |
|---|---|---|---|---|
| 7,600,014 | B2 * | 10/2009 | Russell | ................ H04L 69/329 |
| | | | | 709/223 |
| 8,127,000 | B2 | 2/2012 | Wenig et al. | |
| 8,335,848 | B2 | 12/2012 | Wenig et al. | |
| 8,533,532 | B2 | 9/2013 | Wenig et al. | |

(Continued)

*Primary Examiner* — Mustafa A Amin

(57) ABSTRACT

A system and method for the real-user capable monitoring of the rendering process of dynamically updated web pages is presented. The proposed approach deploys a browser agent to content loaded and displayed by a web browser which monitors resource load activities caused by the processing of the content by the browser and in-place content modifications caused by the executions of scripts and XHR communication by the browser. Those resource load and content modification activities affecting the visible area of the browser are identified and a point in time is calculated at which the visualization of the content for the visible area is complete. Further performance monitoring data describing the performance of the rendering process depending on the percentage of finished portions of the visible area over time is calculated. In addition, data describing the rendering process in detail may be captured by the browser agent which may be used for a later playback of the rendering process.

15 Claims, 18 Drawing Sheets

(56) References Cited

U.S. PATENT DOCUMENTS

| | | |
|---|---|---|
| 8,832,265 B2 | 9/2014 | Kozine et al. |
| 8,868,533 B2 * | 10/2014 | Powell .................. H04L 67/142 |
| | | 707/705 |
| 8,949,406 B2 | 2/2015 | Wenig et al. |
| 9,356,842 B2 | 5/2016 | Greifeneder et al. |
| 9,495,340 B2 | 11/2016 | Powell et al. |
| 9,571,591 B2 | 2/2017 | Greifeneder et al. |
| 9,635,094 B2 | 4/2017 | Damale |
| 9,842,093 B2 | 12/2017 | Powell et al. |
| 10,430,212 B1 * | 10/2019 | Bekmambetov .......... G06F 3/14 |
| 2006/0106702 A1 * | 5/2006 | Pauw ..................... G06Q 10/10 |
| | | 705/35 |
| 2008/0114875 A1 | 5/2008 | Anastas et al. |
| 2010/0313159 A1 * | 12/2010 | Decker ................ G06F 3/0481 |
| | | 715/772 |
| 2011/0264787 A1 | 10/2011 | Mickens et al. |
| 2012/0047427 A1 | 2/2012 | Hauser |
| 2013/0185643 A1 * | 7/2013 | Greifeneder ............ H04L 67/22 |
| | | 715/736 |
| 2014/0136693 A1 * | 5/2014 | Greifeneder ........ H04L 61/1505 |
| | | 709/224 |
| 2017/0019489 A1 | 1/2017 | Churchill |
| 2018/0060283 A1 * | 3/2018 | King ..................... G06F 40/143 |
| 2018/0300197 A1 * | 10/2018 | Marron ............... G06F 11/3628 |

* cited by examiner

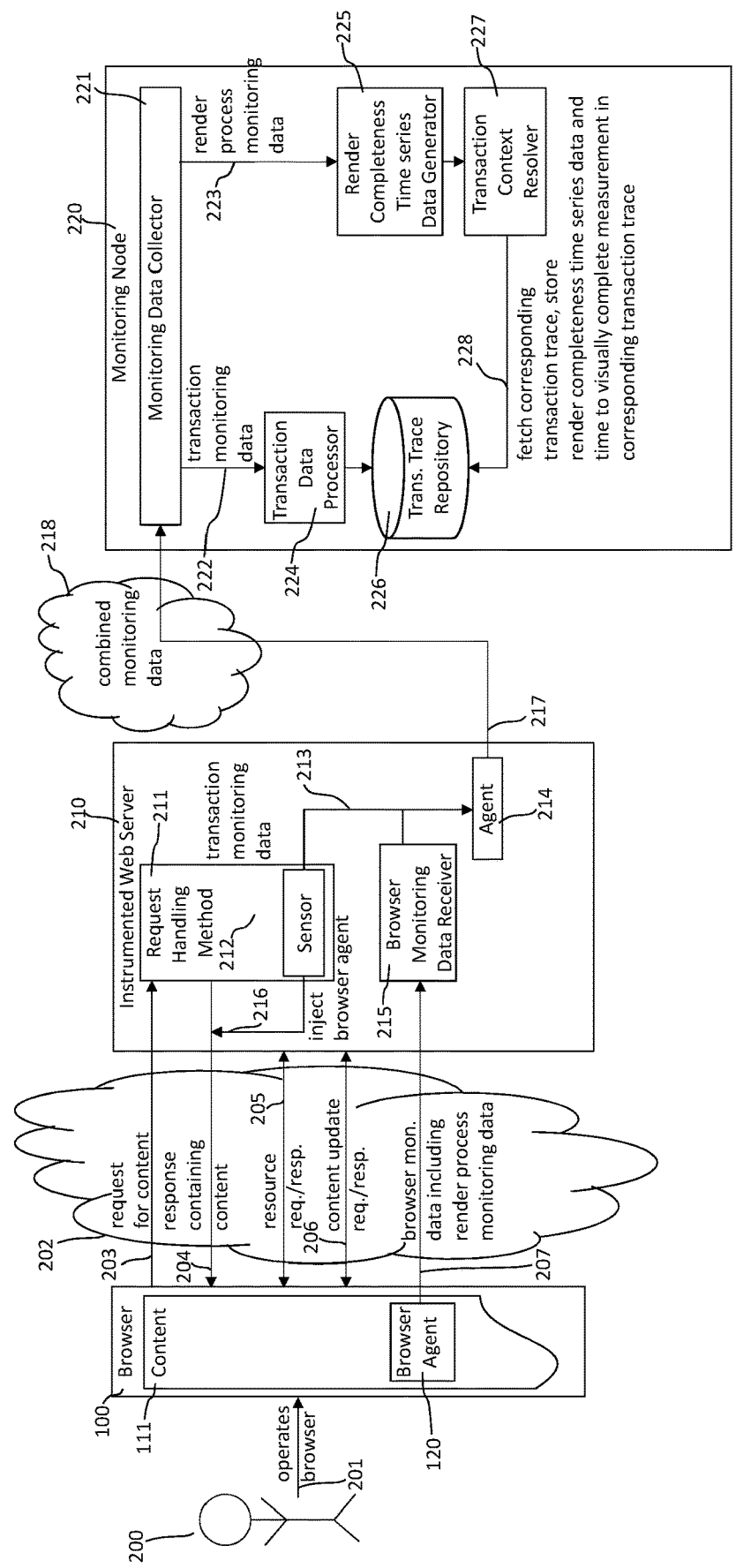

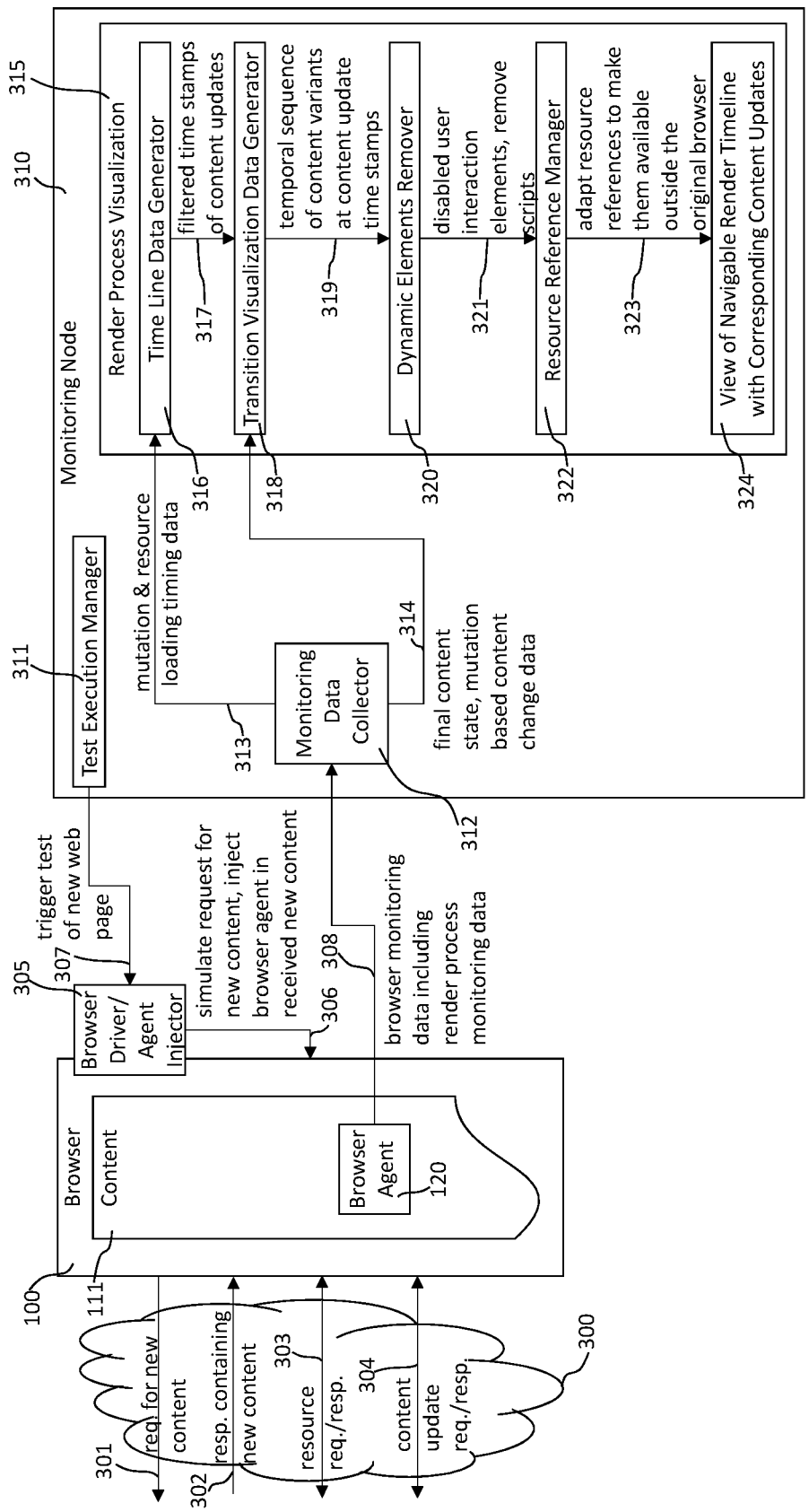

Browser Agent Startup
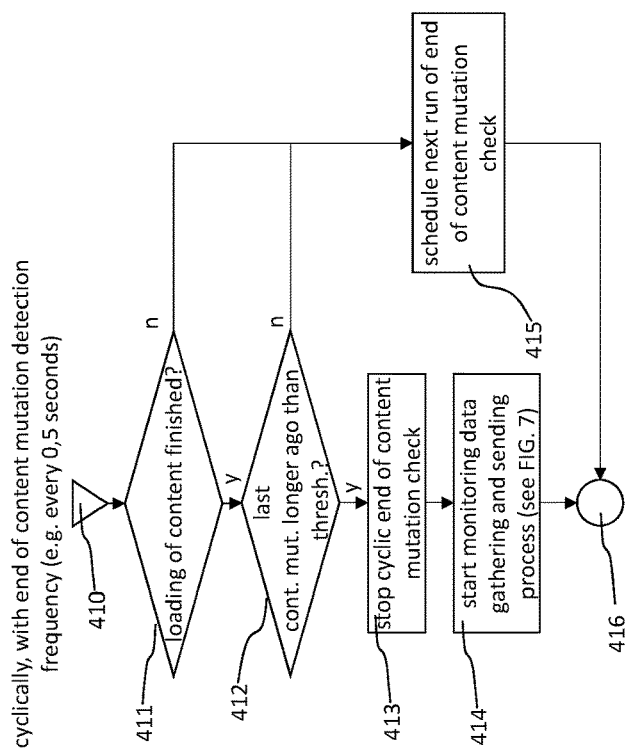
FIG 4b: End of Content Mutation Detection
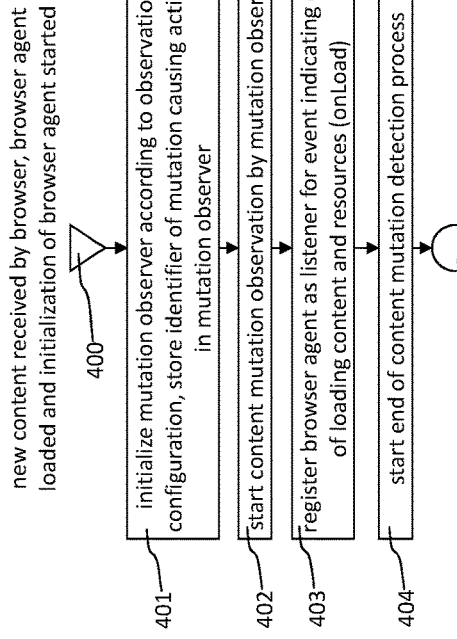
FIG 4a: Browser Agent Initialization

Mutation and Resource Timing Storage Data Structures
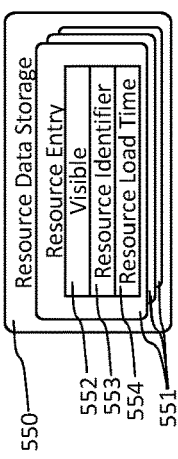
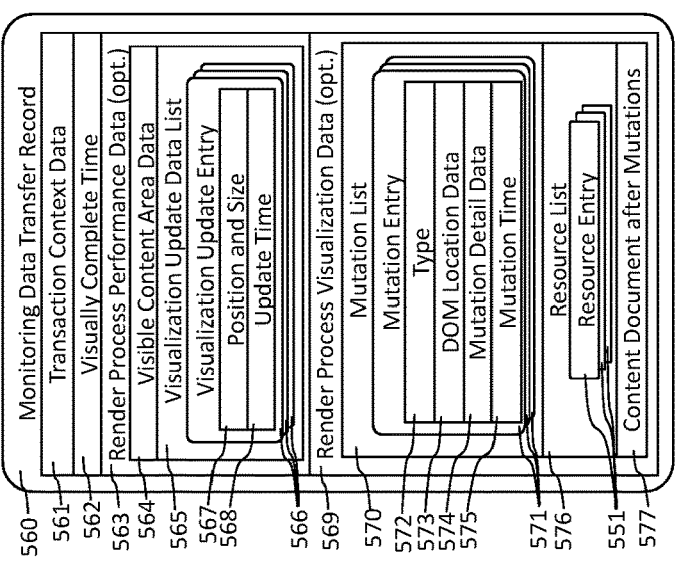
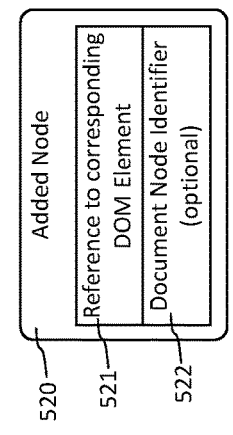
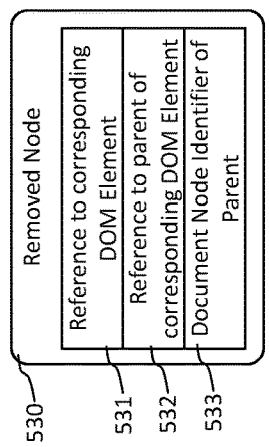
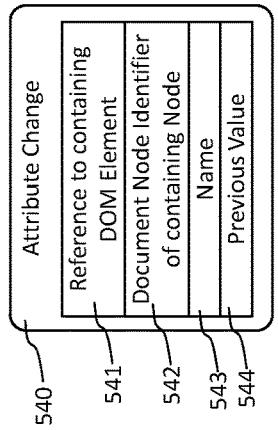
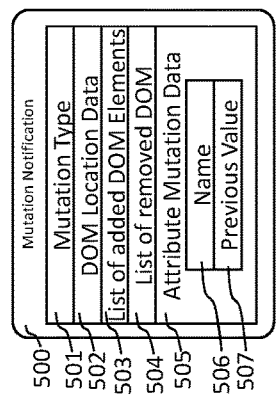
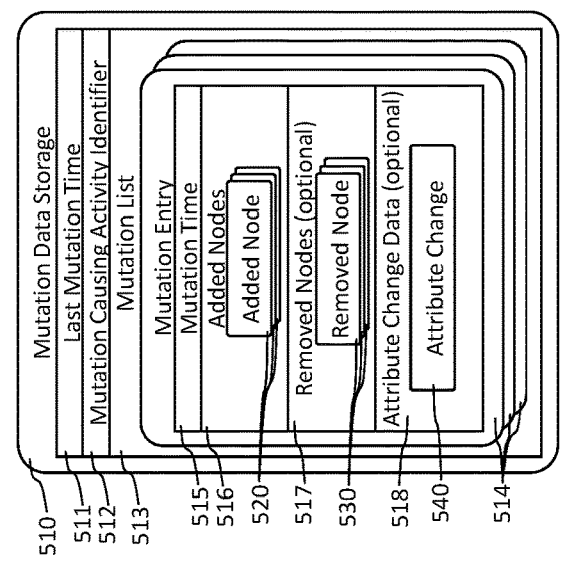

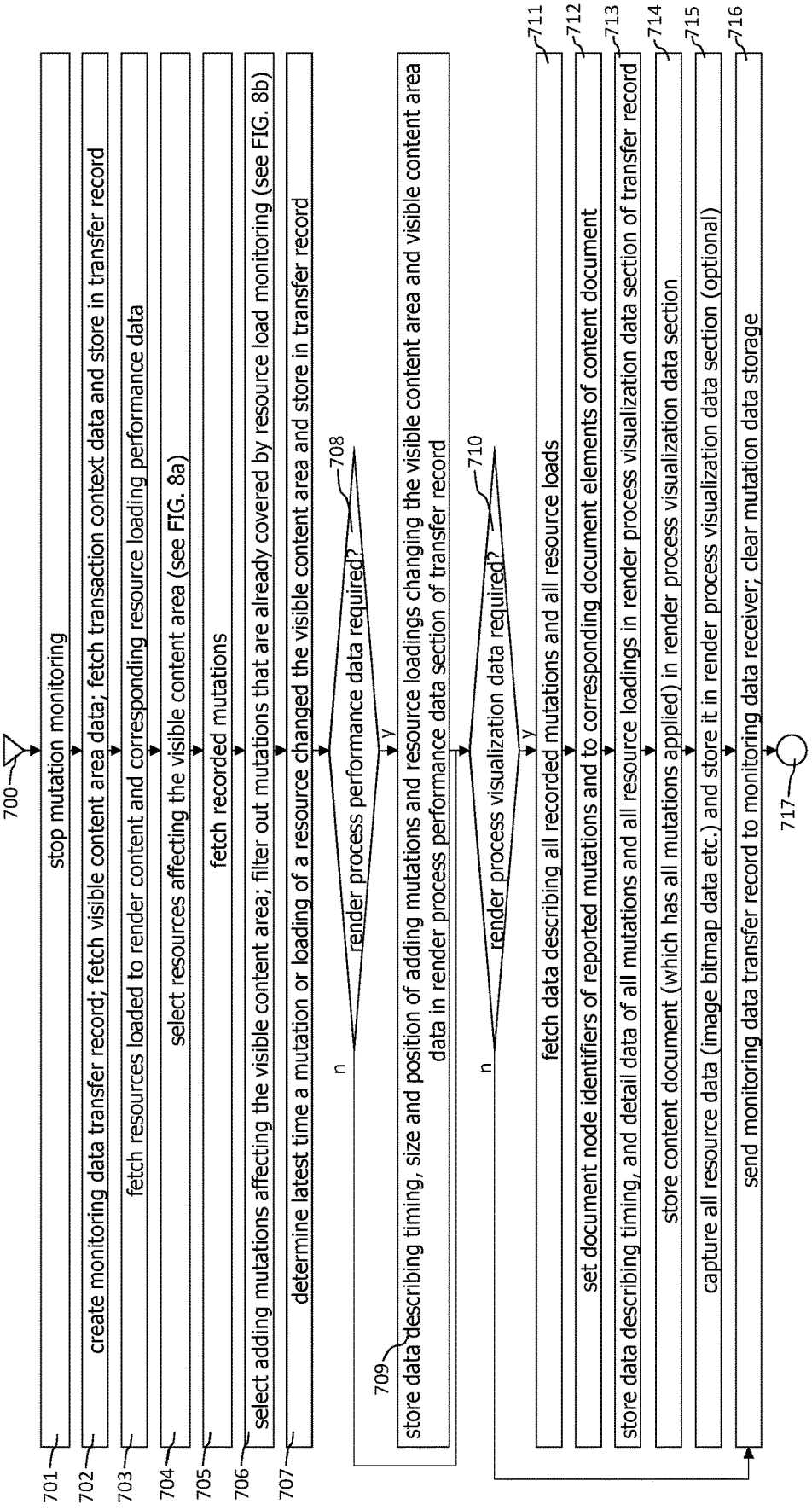

Filtering of Resource Loads and Content Updates affecting Visible Area
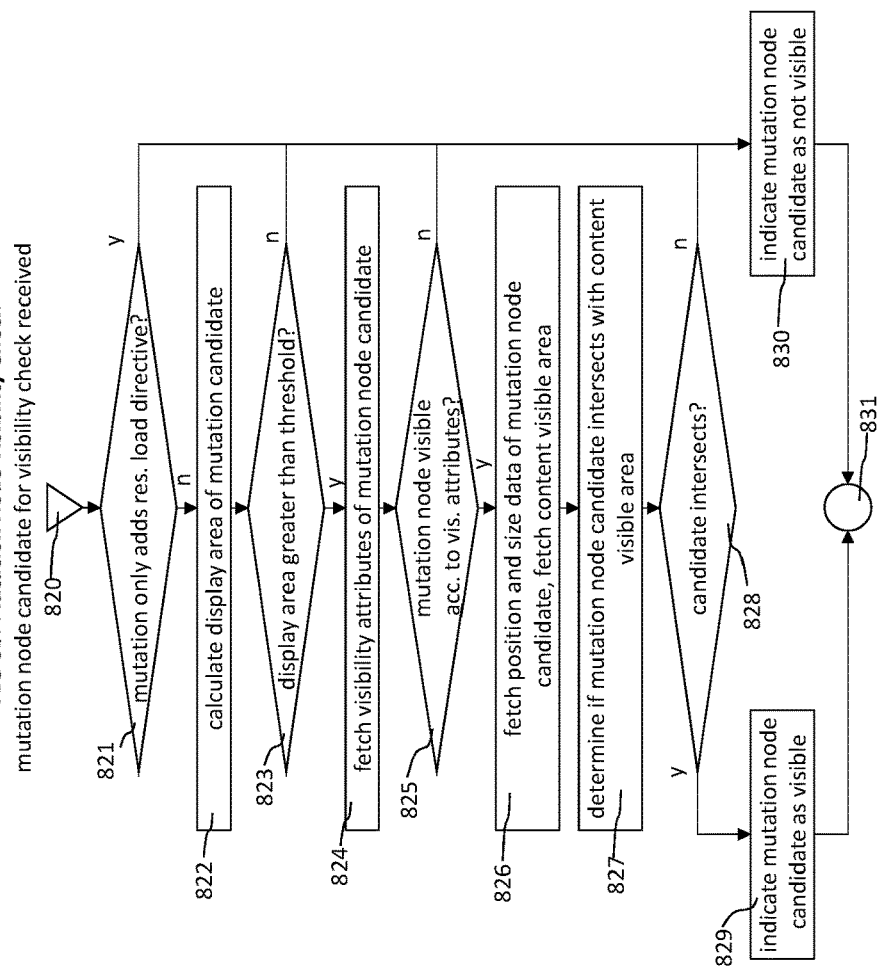
FIG 8b: Mutation Node Visibility Check
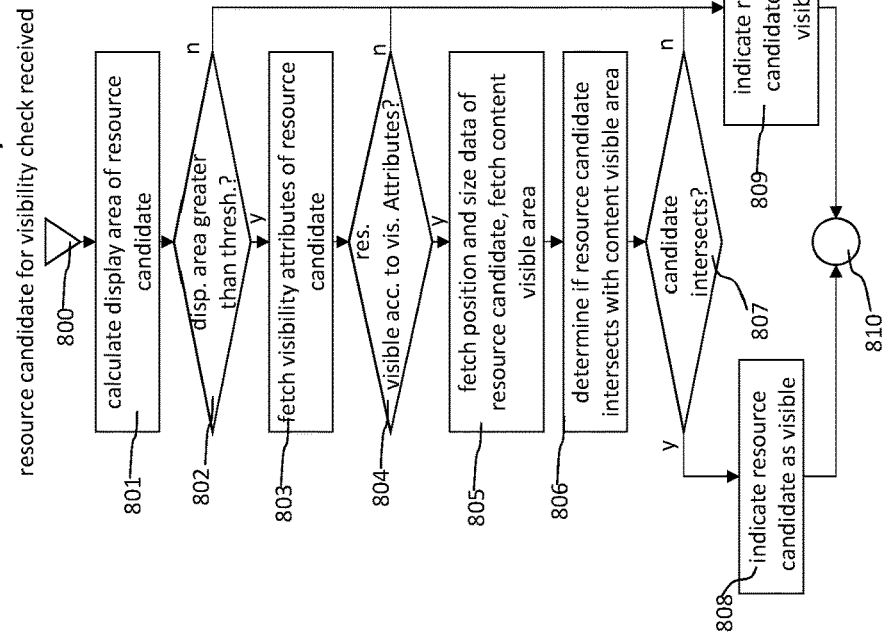
FIG 8a: Resource Visibility Check

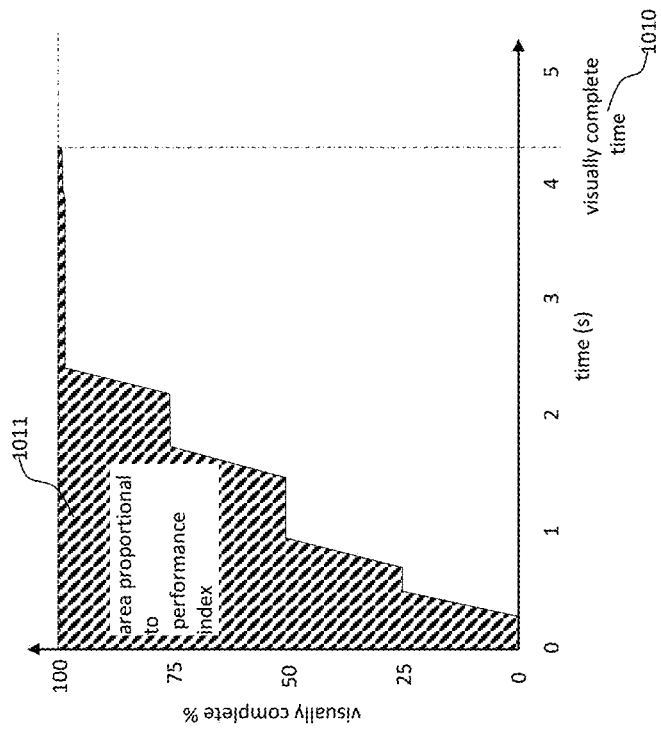
FIG 10a: Performance Index Indicating Slow Rendering
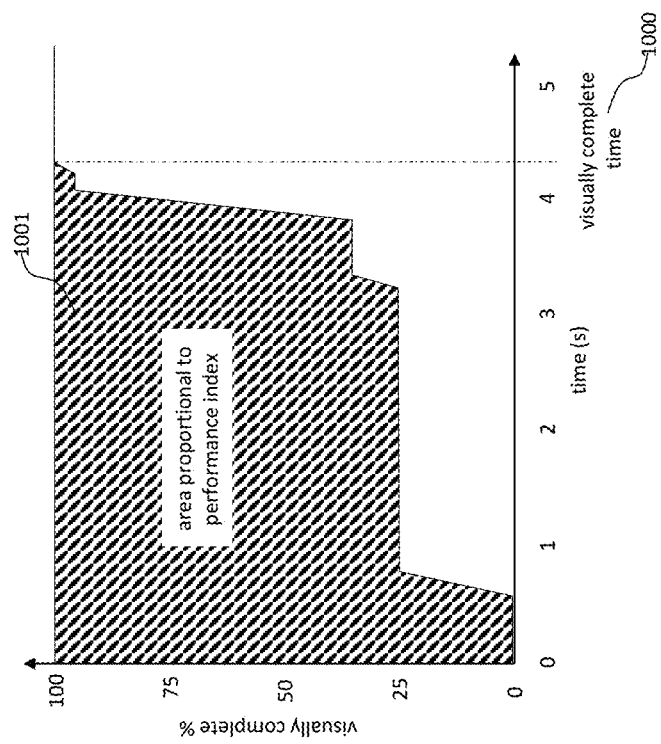
FIG 10b: Performance Index Indicating Fast Rendering

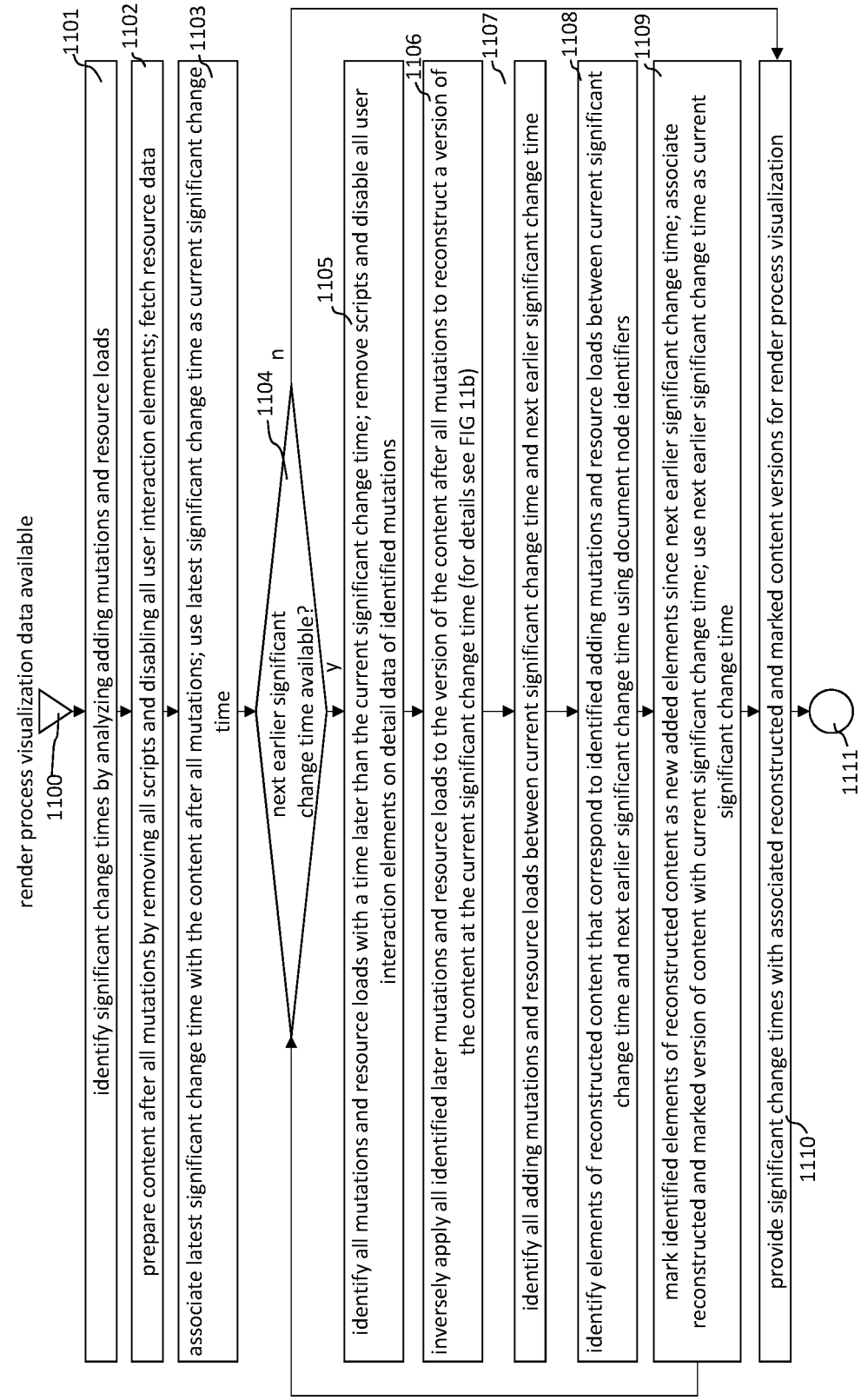

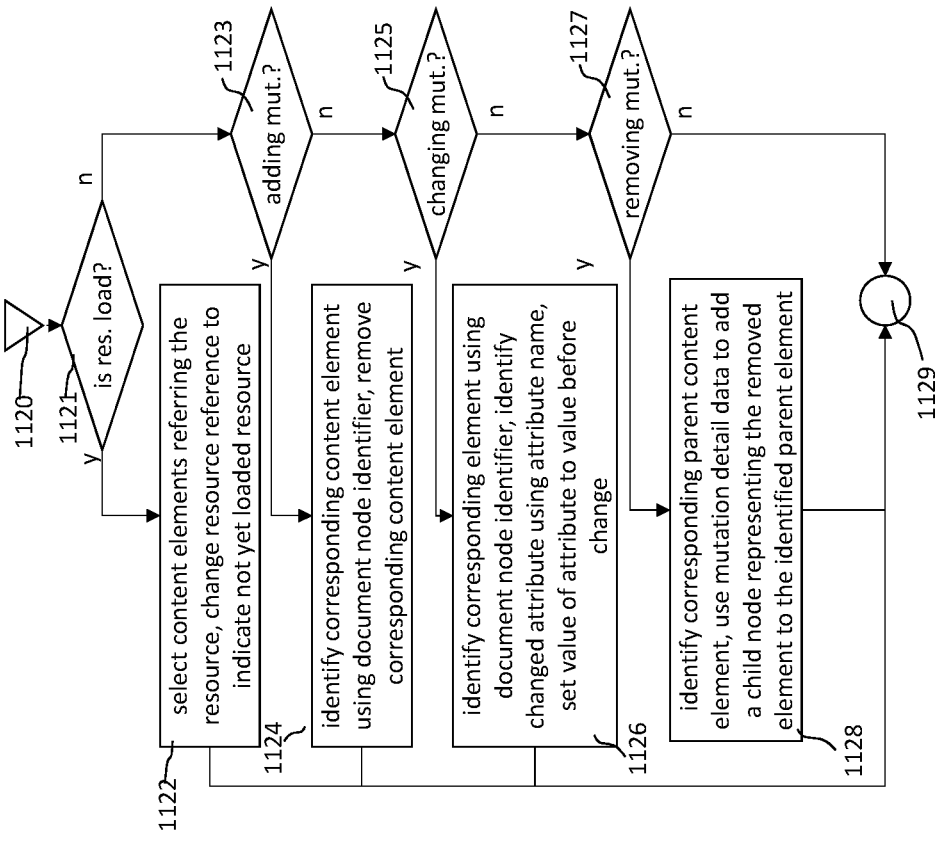
FIG 11b: Inverse Application of Content Change change data for inversion available

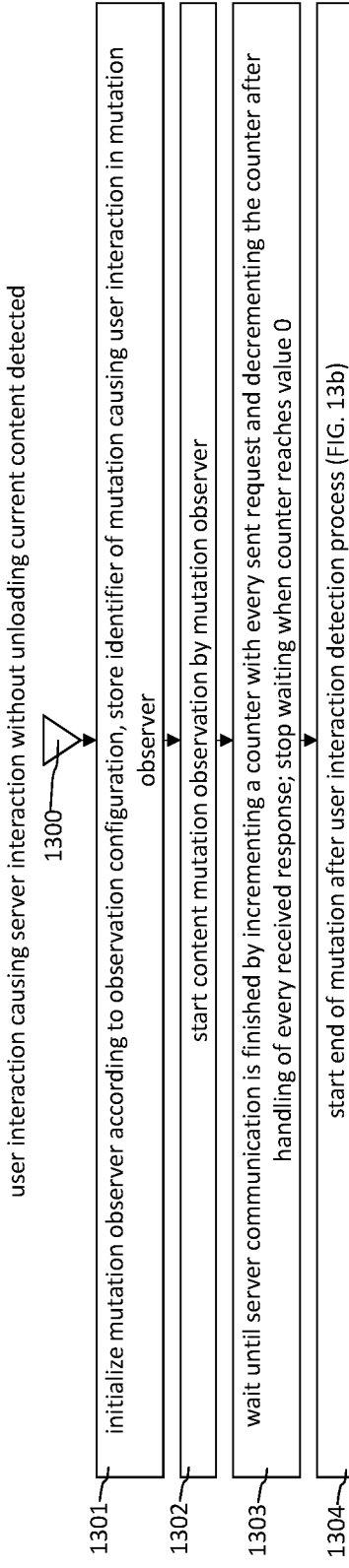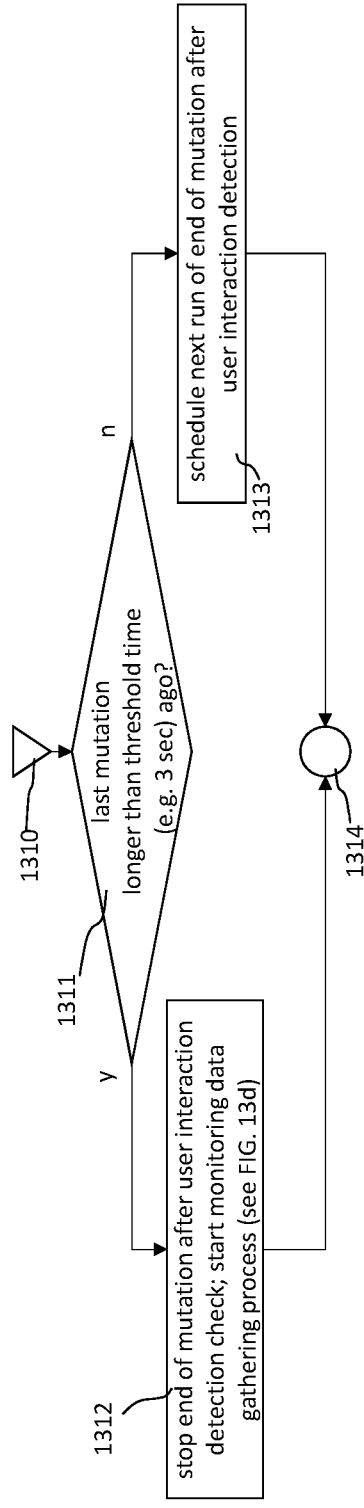

Variant Monitoring Completeness Detection of User Interaction Triggered Browser-Side, In-Place Content Modifications

FIG 13c: User Interaction Variant of Mutation Processing
user interaction causing server interaction without unloading current content detected

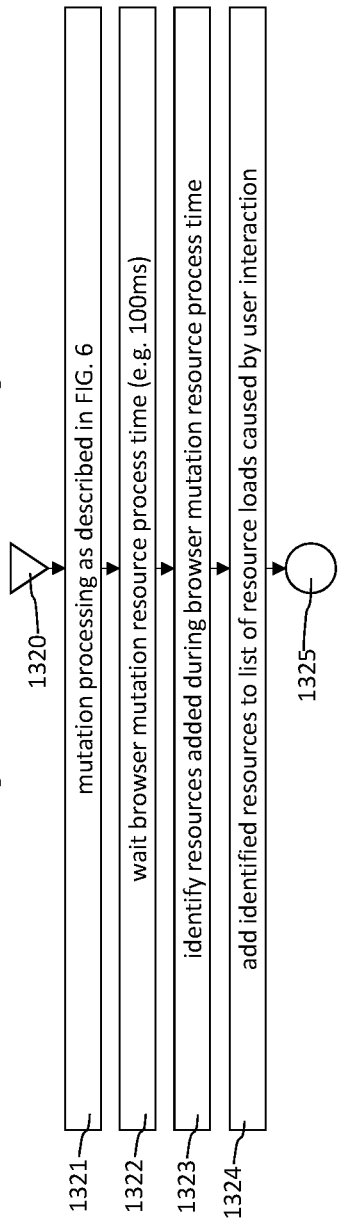

Figure 6:
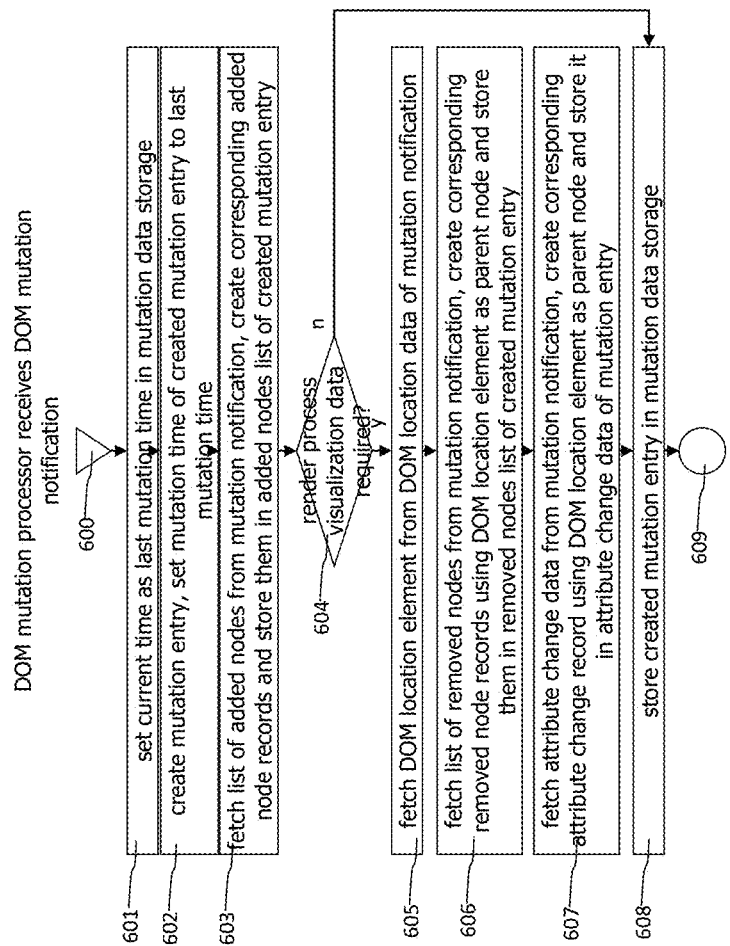

- 1321: mutation processing as described in FIG. 6
- 1322: wait browser mutation resource process time (e.g. 100ms)
- 1323: identify resources added during browser mutation resource process time
- 1324: add identified resources to list of resource loads caused by user interaction

FIG 13d: Gathering and Sending of User Interaction Monitoring Data
mutations ended and all mutation caused resource loads finished or other user interaction or unload

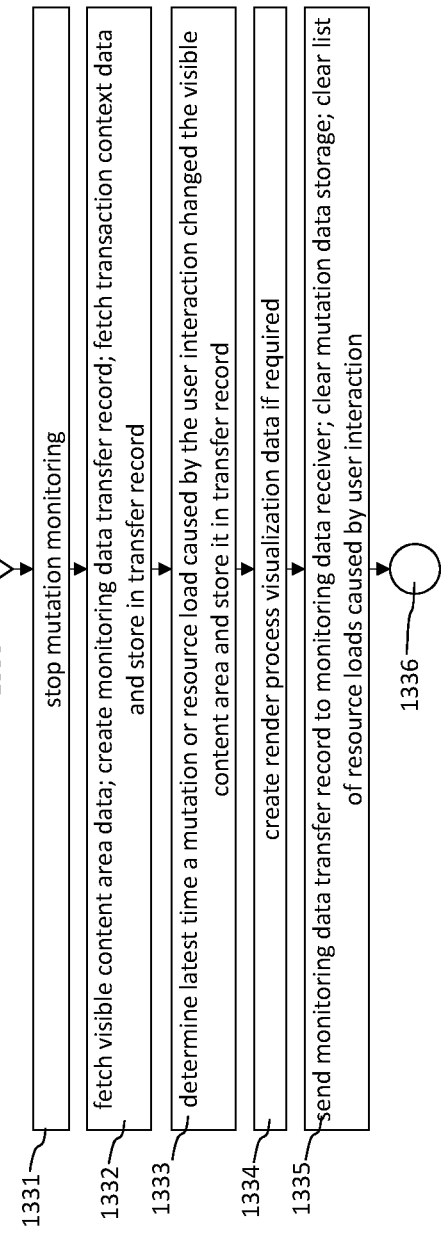

- 1331: stop mutation monitoring
- 1332: fetch visible content area data; create monitoring data transfer record; fetch transaction context data and store in transfer record
- 1333: determine latest time a mutation or resource load caused by the user interaction changed the visible content area and store it in transfer record
- 1334: create render process visualization data if required
- 1335: send monitoring data transfer record to monitoring data receiver; clear mutation data storage; clear list of resource loads caused by user interaction

Variant Support for Multiple Frames with separate, parent-child related DOMs
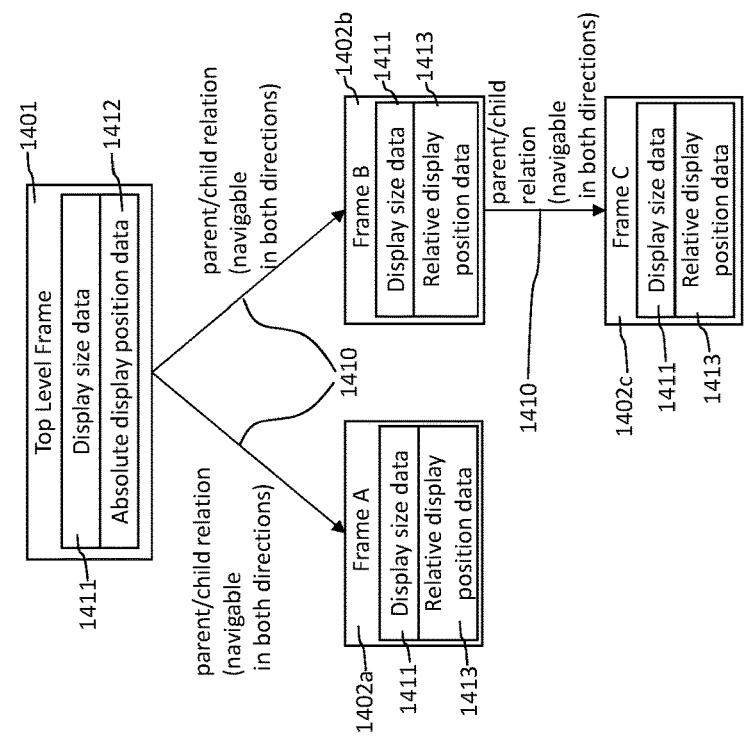
FIG 14b: Logical frame tree structure
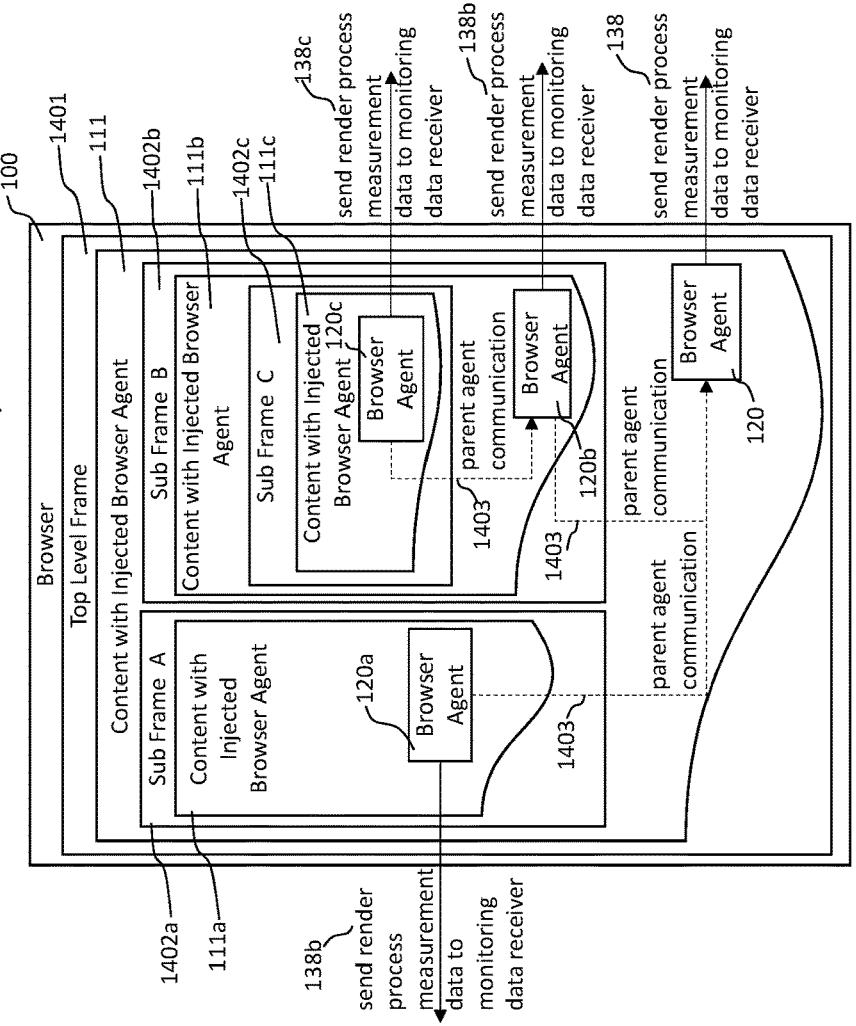
FIG 14a: Instrumented browser with multiple frames

Parent Agent Communication
FIG 15a: Notify Parent Agent on Local Visually Completeness
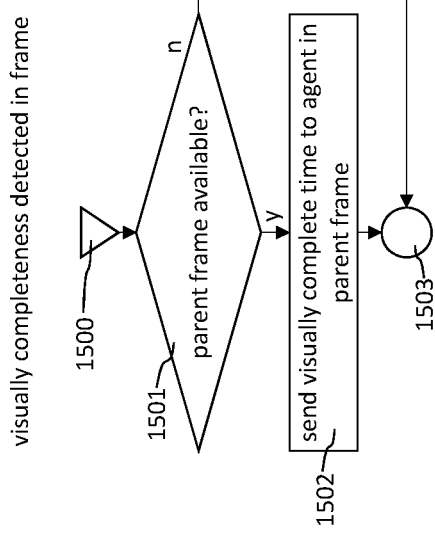
FIG 15b: Receive Child Agent Visually Completeness Notification
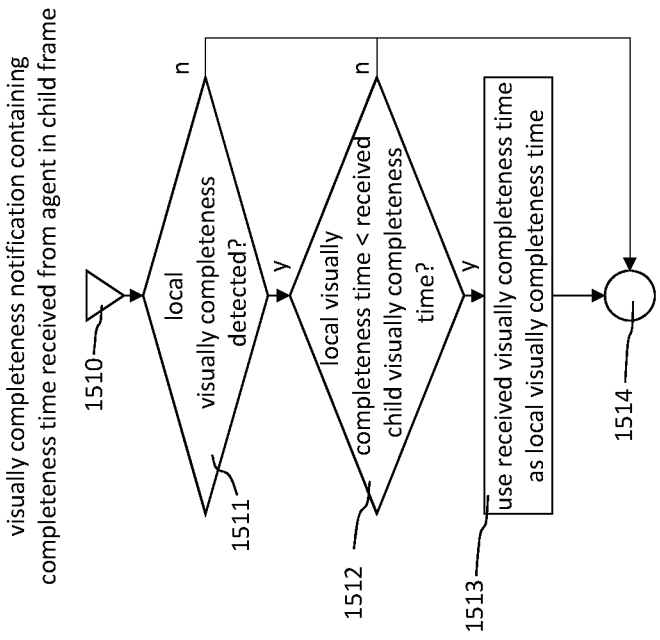

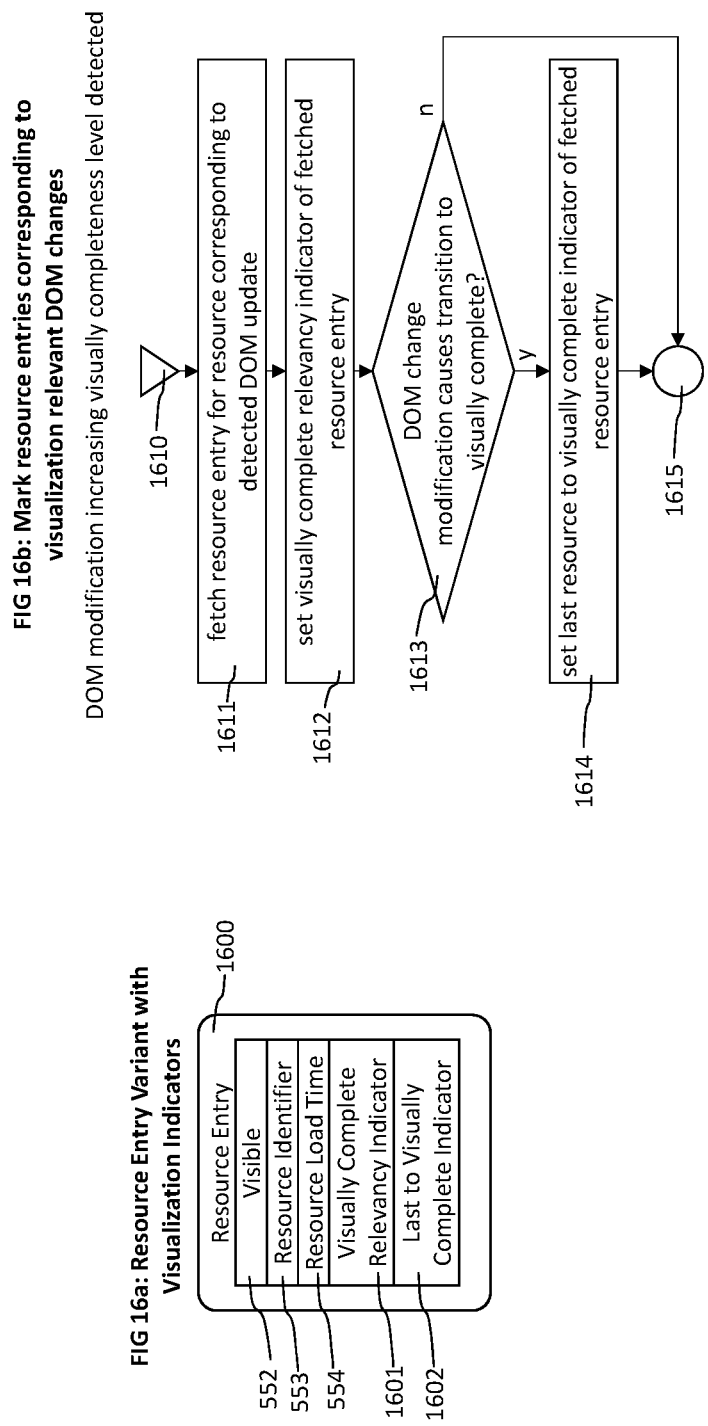

METHOD AND SYSTEM FOR REAL-USER CAPABLE DETECTING OF THE VISUAL COMPLETENESS OF BROWSER RENDERING PROCESSES

CROSS-REFERENCE TO RELATED APPLICATIONS

This application is a continuation of U.S. patent application Ser. No. 16/196,308 filed on Nov. 20, 2018, which claims the benefit of U.S. Provisional Application No. 62/593,429, filed on Dec. 1, 2017. The entire disclosures of the above applications are incorporated herein by reference.

FIELD

The invention relates generally to the monitoring of the rendering process of web pages as performed by web browsers and specifically to detect changes impacting the visible area of the web page during the rendering process in a real-user monitoring capable way and to determine the point in time when all visible portions of the web are completed.

BACKGROUND

The time, until a requested web page is perceived as ready for interaction by the user of the web page is one of the most important performance factors for a web application, as this time represents the wait time for the user and a high wait time increases the probability that a user leaves the web page.

Existing performance monitoring tools use standardized browser notifications that signal that the rendering of received content by the browser is finished, like the "onload" event to provide performance metrics that approximate this wait time. Variants of existing solutions my measure the time until the "onload" event is received and report the time when static rendering of the page is technically finished, other variants may in addition determine the resources (e.g. images) of the loaded web page that are within the visible area of the browser and calculate a point in time when all those visible resources are loaded as load time perceived by the user.

However, both variants do not work in modern, dynamic and asynchronous environments like e.g. Ajax-based web applications which use asynchronous content update mechanisms on the browser side for the dynamic update of already loaded content. Those updates may alter the content before or after an "onload" event which signals that the originally requested content is rendered.

Therefore, traditional approaches to determine the time until a web page is perceived as ready for use may create incorrect results in modern, dynamic application environments.

Consequently, there is a need in the art for a monitoring approach that takes the additional complexity of dynamic and asynchronous web page updates into account for the calculation of a duration until a web page is perceived as ready for interaction.

This section provides background information related to the present disclosure which is not necessarily prior art.

SUMMARY

This section provides a general summary of the disclosure, and is not a comprehensive disclosure of its full scope or all of its features.

The disclosed technology is directed to the real-user capable monitoring of the rendering process of web pages in an environment with dynamic, browser-side in-place modifications of already loaded content. A browser agent is injected into content loaded by a web browser. The browser agent monitors the potentially parallel processes of static content rendering and of dynamic, asynchronous updates of the content, as e.g. caused by XHR communication and script-based, browser-side processing of XHR response data which performs browser-side in-place modifications of the already loaded or currently being rendered content.

The browser agent may monitor the loading of resources (e.g. images) triggered by the browser to render loaded content and provide monitoring data in terms of resource load performance metrics, i.e. in form of a duration until a requested resource was received by the web browser or resource load status indication indicating whether loading of a specific resource was successful. The browser agent may further fetch data describing the portion of the display area occupied by individual requested resources, e.g. in form of position and size of the occupied display area.

In addition, the browser agent may monitor modifications of the browser internal representation of loaded content (i.e. the document object model or DOM) and report the time of the modification and the portion of the display area that is affected by the modification. The agent may further determine the visible display area (e.g. window size) of the browser and identify those resource loads and content modifications that affect the visible display area. Typically, the display area occupied by content size exceeds the visible display area of a browser and only the top-left portion of the content is initially displayed in the display area of the browser. Other parts of the content may be viewed by the user by scrolling down or to the right. Therefore, the portions of the content that are within the visible display area of the browser are of highest importance for the perceived loading performance of a web page.

The browser agent may identify those resource loads and content modification that affected the visible display area of the browser and determine a point in time when all those identified resource loads and content modifications are finished as the point in time when the page was perceived as completed by a user. At this point in time, the processing of web page may not be finished, but all still missing resources or content updates affect a region of the content that is not visible to the user. The browser agent may send the determined monitoring data to a monitoring server for visualization and analysis.

Some variant embodiments may, in addition, provide measurement data that describes the performance of the whole page rendering process. Those embodiments may e.g. monitor the increase of completed portions of the visible display area over time and provide performance metric data describing the increase rate of completed display areas.

Other variant embodiments may in addition to monitoring data describing the performance of the rendering process provide detailed data that describes individual steps of the monitoring process which may be used to a post-mortem reconstruction and replay of the rendering process.

Above embodiment variants may either be used to monitor the rendering process of real users interacting with a monitored web application, or they may be used to monitor the rendering process in a synthetic environment in which user interactions are simulated, e.g. by a test script.

Still other variants may, in case of content separated into multiple frames with corresponding independent but interlinked DOM representations, deploy a separate browser agent to each of those frames. The deployed browser agents may independently monitor the rendering processes performed in their frames and then communicate with each other to potentially correct monitoring results in a way that e.g. monitoring results of an agent in a parent frame considers the monitoring results of agents in its child frames.

Yet other variant embodiments may, during monitoring of the rendering process, mark those resources which had an influence on the visually completeness state of the rendered content.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
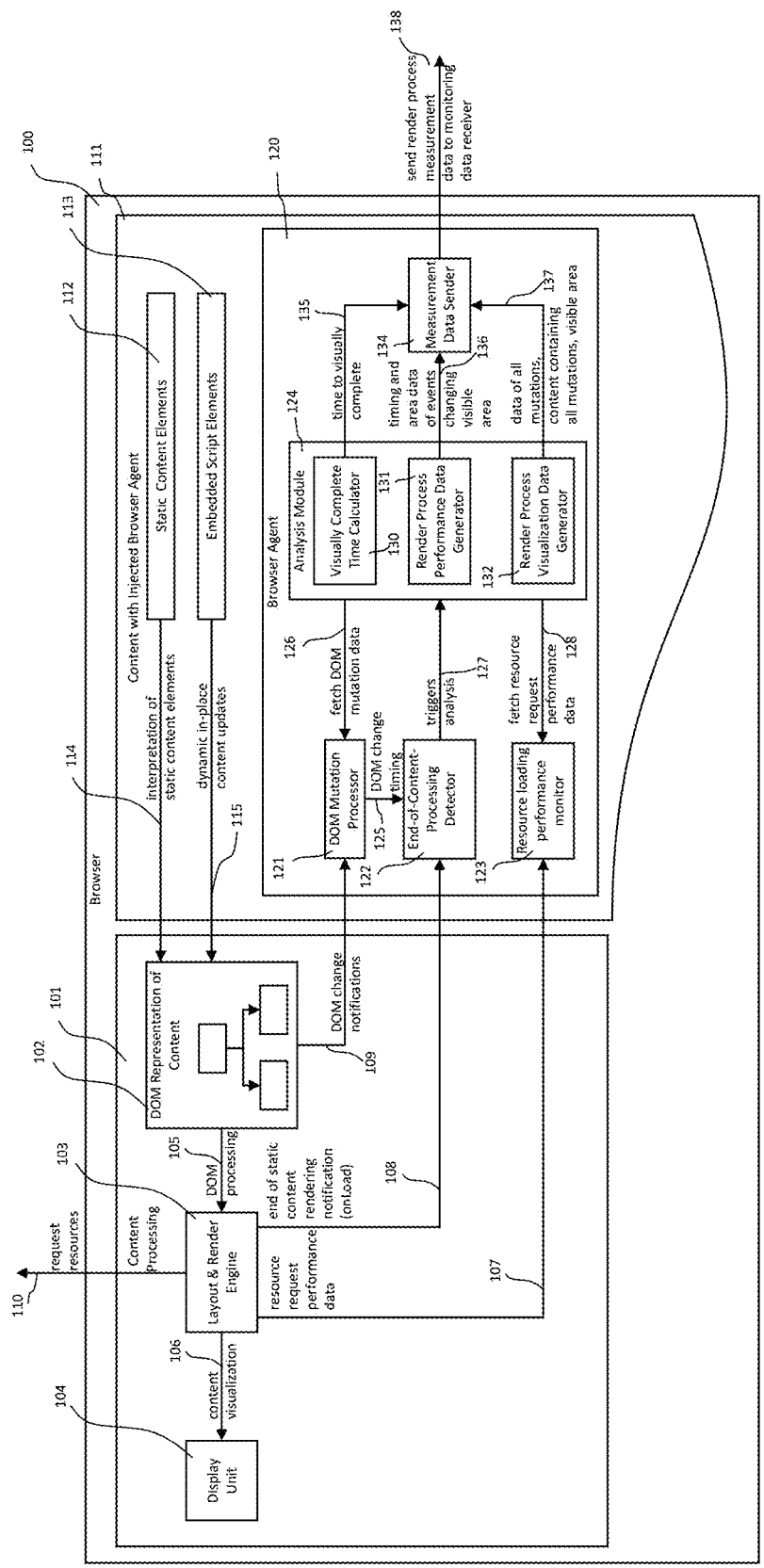

FIG. 1 shows a block diagram of a web browser displaying a web page with an injected browser agent.

FIG. 2 provides a block diagram of a real-user monitoring system that injects a browser agent into content viewed by users, where the browser agent also provides monitoring data describing the rendering of the content.

FIG. 3 depicts a synthetic test setup in which a monitoring server containing a test execution manager drives a web browser containing a browser side test execution and agent injection module. The test execution and agent injection module interprets test request, loads web pages according to test specifications and injects a browser agent into the loaded content. The browser agent also provides monitoring data describing the rendering process to a monitoring node.

FIGS. 4A-B show flowcharts describing the startup of the browser agent.

FIGS. 5A-G describe data records that may be used to store data describing browser-side in-place modifications of already loaded content, to store data describing the timing of resource load requests for resources required to display the content and to transfer monitoring data from a browser agent to a monitoring data receiver like a monitoring node.

FIG. 6 provides a flowchart of the processing of in-place mutations of already loaded content as e.g. reported by a content mutation notification service of the web browser.

FIG. 7 shows a flowchart of the process that fetches monitoring data accumulated by the browser agent and sends it to a monitoring node.

FIGS. 8A-B provide flowcharts of processes that determine if a candidate resource load or content mutation affects the visible area of the browser.

Figure 9:
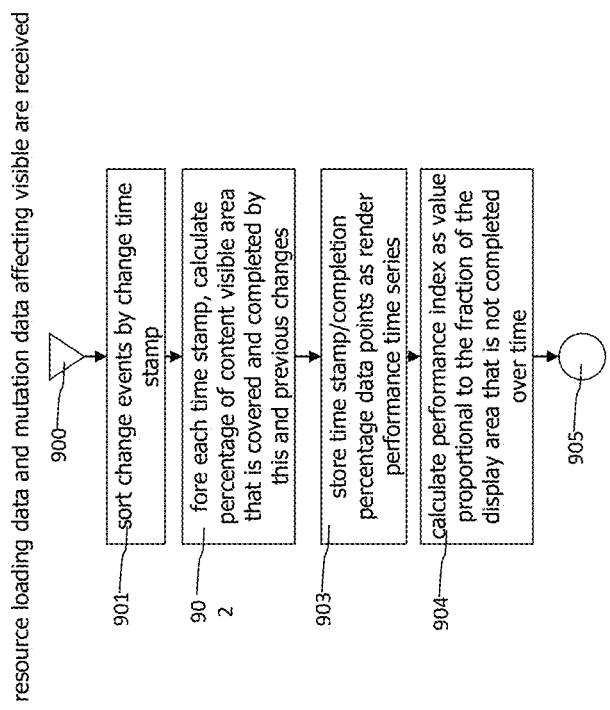

FIG. 9 shows a flowchart of a process that calculates a performance metric describing the overall performance of the content rendering process.

FIGS. 10A-B show charts for two render processes with the same complete time but with a different development of the percentage of rendered content over time to illustrate the overall performance metric or performance index.

FIGS. 11A-B depicts processes that interpret captured render process monitoring data to create visualization data that allows a user to step through or replay the rendering process.

Figure 12:

FIG. 12 shows a screenshot of a render process visualization containing a timeline to navigate between different events affecting the visible browser area and a corresponding visualization of the content at the specific time selected in the timeline, where the content visualization highlights content elements that changed between the selected and the previous timestamp in the timeline.

FIGS. 13A-D depicts processes that may be used to capture, process and visualize in-place content mutations caused by user interactions that communicate with a web server to fetch data and then perform in-place manipulation of the currently loaded content according to the fetched data without unloading the currently loaded content.

FIGS. 14A-B provide an overview of a system that supports the monitoring of content that is split into multiple frames having independent but linked DOMs.

FIGS. 15A-B describe exemplary communication activities between browser agents deployed to different, simultaneously displayed frames.

FIGS. 16A-B describe a variant of the described system that in addition marks resources that are relevant for the visually completed state of displayed content.

Corresponding reference numerals indicate corresponding parts throughout the several views of the drawings.

DETAILED DESCRIPTION

Example embodiments will now be described more fully with reference to the accompanying drawings.

Embodiments of the present invention are directed to the monitoring of the rendering process of those portions of a web page that are relevant for the consumer of the web page. Web pages are displayed by web browsers with a limited display area and only portions of a rendered web page that fall into this browser display area are typically relevant for the consumer of the web page.

The rendering process of a web page is influenced by static and dynamic elements of the content document representing the web page. Static elements, like formatting or resource elements, are sequentially interpreted by the web browser to create a visual representation of the web page. Dynamic elements, like scripts, are executed by the web browser in parallel to the interpretation of static elements. Those scripts may interact with remote components, like a web server that provided the content document representing the web page and they may perform modifications of the static elements of the content document while the rendering process of the web page is ongoing. The web browser recognizes those modifications and updates the visual representation of the web page accordingly. Therefore, the rendering process can only be considered as completed when the rendering of static elements of the content document and the execution of scripts that are started during the interpretation of the content document are finished.

This application architecture pattern for web applications in which content is initially transferred from a web server to a web browser and is then modified in-place on the web browser is widely used in the industry. Technologies and frameworks like AJAX or Websockets provide functionality that ease data exchange between the web server and web browser without completely discarding old content and loading and rendering new content. XMLHttpRequest/Response (XHR) pairs represent a communication protocol between the web server and a web client that may be used to transfer data from a web server to a web browser without causing the web browser to unload currently displayed content and interpreting the data received from the web server as new content that should be rendered.

This browser-side, in-place modification approach also enables the creation of "Single Page Applications" in which a web browser loads an initial web page when the user first interacts with the application. All subsequent interactions only perform browser-side in-place modifications of the initial web page. The initial web page is only unloaded when the user moves to another application.

The performance of the render process of a web page, especially of those areas of the web page that are within the display area of the web browser is a key factor for the acceptance of the web page, as slow rendering of those areas increases the time until the web page is perceived as complete and ready for interaction. A slow rendering of the visible areas also increases the probability that users move away from the web page.

Therefore, exact and timely knowledge about the performance of the rendering process is crucial for the management of web applications to perform countermeasures in time. Monitoring approaches that only consider the static rendering process and neglect the influences of dynamic, asynchronous in-place modifications of the web page e.g. caused by the execution of scripts by the web browser may provide incorrect and misleading monitoring data.

Referring now to FIG. 1 which conceptually describes the processing of static and dynamic elements of a content document representing a web page by a web browser in conjunction with a browser agent injected into the content document that monitors the rendering process.

A web browser 100 contains a content processing unit 101 which interprets and renders received content to create a visual representation of the content. Content e.g. in form of an HTML document is parsed and interpreted by the content processing unit 101 to create a DOM (Document Object Model) representation of the content 102. The DOM representation is an intermediate form of the content that is used by the layout and render engine 103 to create visualization data 106 for the content which is used by a display unit 104 to present the content, e.g. on the computer screen of the user. Further, the layout and rendering engine 103 identifies resources like images that are referred by the content and requests 110 those resources as they are required to render the content. The layout and rendering engine may also provide performance measurement data 107 for resource requests. The resource request performance data may e.g. include for each requested resource the point in time when the resource was requested and when the requested resource was available at the browser. In addition, resource request performance data may contain status data indicating whether a described resource request was successful. The resource request performance data may be provided by the web browser according to the W3C Resource Timing standard (see https://www.w3.org/TR/resource-timing/). In addition, the web browser 100 provides a notification interface 108 for scripts embedded in the content that notify those scripts that the static content rendering process is finished (see e.g. "onload" event).

The DOM representation 102 of the content may also be accessed and modified by script elements 113 of the content. Those script elements may add new formatting or resource elements to the DOM representation, modify elements of the DOM representation or remove existing elements from the DOM representation. The layout and render engine 103 is notified about updates to the DOM representation and processes 105 those updates to the DOM representation to generate a visualization of the web page according to the changed DOM representation. The web browser also provides interfaces for scripts contained in the content to get notified 109 on updates to the DOM representation (see e.g. Oracle JavaScript® "MutationObserver" interface).

It is noteworthy that the concept of processing notifications affecting the display area of the browser is not restricted to DOM mutations. All other notifications regarding the rendering process may be used, as long as those notifications contain data describing the portion of the display area that is affected by the notified event.

Some older browser versions may not provide a DOM change notification interface 109 as shown in FIG. 1. Variant embodiments of browser agents designed to also work on such browser versions may in a first step determine if the browser to which they are deployed provides a DOM change notification interface 109. In case the browser does not provide such an interface, the browser agent may approximate such a DOM change notification service by cyclically (e.g. every 100 ms), creating and storing a copy of the current state of content document (e.g. either as document text or as separate DOM data structure), and comparing the current content state with the content state of the last cycle to identify mutations that occurred between the current and the last cycle. Those mutations may then be formatted and structured similarly to mutation data provided by a conventional DOM change notification service 109. Those formatted and structured mutation notifications may then be forwarded to portions of the browser agent (e.g. the DOM mutation processor) that process those mutation notifications.

FIG. 1 shows a web browser 100 that currently displays content 111 with an injected browser agent 120. The content 111 consist in static content elements 112 like formatting and resource elements that are interpreted 114 by the web browser to create a visual representation of the content, and embedded script elements 113 which are executed by the web browser and which may perform dynamic in-place content updates 115 that change the DOM representation of the currently loaded content (and in turn also change the visual representation of the content) without causing a reload of the content and a complete replacement of the DOM representation. Embedded script elements may either directly contain script commands that should be executed as part of the content, or they may specify the location of a resource that contains the script commands. In case a script element specifies a resource location, this resource is first requested and loaded by the web browser before the script contained in the requested resource is executed. Besides static and script elements the content 112 also contains a browser agent 120 which may also be implemented in form of an embedded script elements. The browser agent may e.g. have been injected into the content by an agent injected into the web server that created and provided the content. It is noteworthy that the browser agent 120 may be implemented with standard web browser scripting functionality (e.g. Oracle JavaScript®) and may, therefore, be injected in any web page and operated by any web browser in a way that is transparent and imperceptible for an end user consuming using the web browser to consume web pages.

The browser agent consists of a DOM mutation processor 121 which gets notified about DOM modifications 109 and which records DOM elements affected by the modifications and the time at which the modification occurred. The resource loading performance monitor 123 requests 107 data describing the performance of resource requests performed to render the currently displayed web page.

The end-of-content processing detector 122 is registered for notifications about the end of static content rendering ("onload" event) and requests timing data of DOM changes 125 from the DOM mutation processor 121. The end-of-content processing detector combines the notification data about the end of the static content render process with DOM change timing data to determine a point in time at which both static content rendering and dynamic script based in-place content modifications are finished. The end-of-content processing detector may e.g. record the end time of the static content rendering process and the time of the last DOM change. It may further determine if the last DOM change is longer ago than a specific threshold time (e.g. 0.5 or 1 seconds) and in this case, assume that no further DOM change can be expected and the dynamic, script-based content update processing is finished. In case no further dynamic content update can be expected and the static content rendering process is finished, the end-of-content processing detector may assume that the complete content processing is finished and trigger 127 a combined analysis of the DOM update or mutation data recorded by the DOM mutation processor 121 and resource loading performance data fetched 107 by the resource loading performance monitor 123.

When processing resource load performance data, the resource loading performance monitor 123 may distinguish between resource loaded from the same location (i.e. web server) as the web page and resources loaded from other locations. This distinction may be used to determine if render performance problems are caused by resources loaded from third-party locations.

The triggered analysis may be performed by an analysis module 124. On a triggered analysis, the analysis module fetches 126 recorded DOM mutation data from the DOM mutation processor 121 and fetches 128 resource request performance data form the resource loading performance monitor 123. The fetched monitoring data is forwarded to a visually complete time calculator 130, a rendering process performance data generator 131 and a rendering process visualization data generator 132.

The visually complete time calculator 130 and render the process performance data generator 131 may identify and use those resource loads and mutations that affected the visible area of the web browser.

Filtering of resource and mutation monitoring data affecting the visible browser area may be performed by fetching the position and size of loaded resources and of areas affected by DOM mutations to determine their affected display area. The intersection between the visible area of the browser and the affected display area of each resource load or DOM mutation may be calculated to identify resource loads and DOM mutations that intersect with the visible area of the browser. The resource loads and DOM mutations that intersect with the visible content area of the web browser also affect the display area of the web browser.

Typically, a web browser maintains a display area of limited size to visualize web pages. Web pages often require a display area that is larger than the display area of the web browser. In this case, only a fraction of the web page is displayed and the user may use scrolling features of the web browser to view all portions of the web page. A web page is typically considered as complete and ready for use when the rendering process of the portion of the web page that covers the display are of the web browser is finished. Therefore, it is of interest for the calculation of render performance metrics of web pages to identifies those DOM mutations and resource loads that affect the display area of the browser, as those have the greatest influence on the perceived performance of the web page.

The visually complete time calculator module 130 may use the filtered resource load and mutation data to determine the latest time a resource load was completed or a DOM update was performed that affected the display area of the browser as the point in time when the page was visually complete. The visually complete time calculator 130 may further calculate a duration until the web page was visually complete by subtracting a point in time corresponding to the request of the web page, like the time when the request for the web page was sent from the web browser or the time when the first byte of the web page was received by the browser, from the time when the web page was visually complete.

The rendering process performance data generator 131 may process the filtered resource load and mutation data of resource loads and mutations affecting the visible area to calculate metric data that describes the progress of the portion of the display area that was completed during the rendering process. This may include sorting DOM mutations and resource loads chronologically, starting by the oldest and determining for each resource load or mutation the accumulated portion of the display area that is covered by the resource load or mutation and all earlier resource loads and mutations.

The advance of the completed portion of the display area may be calculated by iterating over the temporally sorted resource loads and mutations and by stepwise aggregating the area affected by those resource loads and mutations to get a function describing the percentage of the display area that is finished over time. The graphs that are shown in FIG. 10 visualize the generated render performance data.

The rendering process visualization data generator 132 uses unfiltered resource load and mutation data (i.e. data describing all resource load and mutations, regardless if they affect the visible content area of the browser) to create data that may be used to replay the rendering process on a remote computer or a remote browser and to provide visualizations of different stages of the rendering process. The rendering process visualization data generator 132 fetches the state of the content after the whole rendering process is completed, data of all occurred DOM mutations and resource loads and data describing the display area of the browser. For DOM mutations that removed or changed DOM elements, also data required to reconstruct the state before the mutation (e.g. for removing mutations removed content elements, for changing mutations, values before the change) is fetched. The fetched data may later be used to reconstruct the rendering process by starting with the state of the completed content with all mutations applied, and then stepwise applying inverse versions of the recorded DOM mutations to get states of the content before the mutations. A detailed description of this process is shown in FIG. 11 and a screenshot of an exemplary render process visualization is shown in FIG. 12.

The data generated by visually complete time calculator 130, render process performance data generator 131 and render process visualization data generator 132 is forwarded to a measure data sender 134 which sends the received data to a monitoring data receiver like a monitoring server.

It is noteworthy that the processing performed by visually complete time calculator 130, render process performance data generator 131 and render process visualization data generator 132 may be performed by the browser agent on the web browser as described above. It may, however also be performed by a receiver of raw monitoring data like a monitoring server, or the processing may be distributed between browser agent and monitoring server.

Referring now to FIG. 2, which shows an overview of a real user monitoring system, in which a user 200 operates a web browser 100 which fetches 203 web pages/content 111 from an instrumented web server 210 via a connecting computer network 202. An agent 214 is injected into the web server which instruments request handling methods with a sensor 212. The sensor monitors requests 203 received by the web server and creates corresponding monitoring and tracing data 213 which is forwarded to an agent 214. In addition, the sensor injects 216 a browser agent 120 into requested content which is transferred to the requesting web browser with a response 204. The browser 111 receives the content and starts rendering it. During rendering the content, the web browser may send requests for resources required to render the content to the web server 210 and may receive corresponding responses containing those resources. The browser may, in addition, execute scripts embedded in the content which may modify the content on the web browser and communicate with the web server via content update requests and responses 206.

The browser agent 120 may be implemented in form of a script embedded in the content, and it may be injected into the content in a way that the browser agent 120 is the first script of the content that gets executed.

The browser agent may monitor browser side activities, like interactions of the user with the content, and it may also monitor the rendering process of the received content as described above. Browser monitoring data 207 created by the browser agent 120 and tracing data 213 generated by the agent 214 may contain correlation data that may be used to identify corresponding browser monitoring and server-side tracing data. E.g. to identify for trace data describing the processing of a request for a specific content on the web server, the corresponding browser monitoring data describing the rendering performance of the requested content.

Agent 214 injects a browser monitoring data receiver function 215 into the instrumented web server. The browser monitoring data receiver function 215 receives browser monitoring data from the browser agent 120 residing on the web browser 100. The browser monitoring data receiver function sends the received browser monitoring data 207 to the agent 214. The agent forwards 217 received browser monitoring data 207 and transaction monitoring data 213 to a monitoring node or monitoring server 220.

The monitoring server 220 forwards received combined browser and server-side monitoring data to a monitoring data collector 221 which extracts transaction monitoring data and sends it to a transaction data processor 224. Transaction monitoring data includes data describing browser side activities that may e.g. be recorded by the browser agent 130 in addition to data describing browser side content rendering processes and data describing server-side request processing activities recorded by the agent 214.

The transaction data processor 224 combines received transaction monitoring data to incrementally build end-to-end transaction trace data which is stored in a transaction trace repository for later visualization or analysis.

The monitoring data collector 221 further extracts render process monitoring data which is sent to a render completeness time series data generator 225, which creates time series data describing the performance of the observed content rendering process, e.g. in form of a time series that describes the increase of the percentage of the completed content area over time. The render completeness time series data generator 225 may communicate with a transaction context resolver 227 which uses correlation data contained in received render process monitoring data (e.g. transaction context data as described later) to identify end-to-end transaction trace data of the transaction execution that caused the render processes described by the received render process monitoring data. Both end-to-end transaction trace data and render process monitoring data may contain an identifier that uniquely identifies the browser side user interaction that caused the execution of the transaction described by end-to-end transaction trace data and that also caused the rendering process described by the render process monitoring data. The browser agent 120 may assign those identifiers to transaction monitoring and render process monitoring data and may assure the same identifier is assigned to transaction monitoring and render process monitoring data caused by the same user interaction.

The transaction context resolver may fetch the end-to-end transaction trace data corresponding to received render process monitoring data and store time series data created by the render completeness time series data generator 225 in the fetched end-to-end transaction trace data. Other render monitoring data, like the time until the rendering process was visually complete as calculated by the visually complete time calculator may also be added to the fetched end-to-end transaction trace data.

Referring now to FIG. 3, which shows a block diagram of a synthetic testing and execution monitoring system. The system consists of a web browser 100 and a synthetic monitoring node 310. The web browser 100 includes a browser driver/agent injector module 305 which may be added to the web browser 100 during setup of the monitoring system, e.g. by installing a corresponding browser plugin. The browser driver/agent injector 305 receives commands 306 from a test execution manager 311 of the monitoring node 311. Those commands may e.g. cause the web browser 100 controlled by the browser driver/agent injector 305 to request new content or to simulate user interactions on already loaded content. In case the browser driver/agent injector causes the web browser to load new content, it also injects a browser agent 120 into the newly loaded content. The web browser 110 sends requests for new content 301 to a remote web server (not shown) via a connecting computer network 300 and receives responses 302 containing the requested content. The content 111 is loaded and processed by the web browser, which requests and receives 303 resources referred by the received content and which also sends requests and receives responses 304 corresponding to browser-side in-place modifications of already loaded content.

The browser agent 120 monitors browser side activities and sends corresponding monitoring data 308 including data describing the monitored rendering process to the monitoring node 310.

The monitoring node 310 forwards received browser monitoring data to a monitoring data collector 312. The monitoring data collector may, similar to the real user monitoring scenario as described in FIG. 2 separate and process transaction monitoring data and render performance data contained in received browser monitoring data. The browser monitoring data may also contain render process visualization data as e.g. created by a rendering process visualization generator 132. This render process visualization data may contain data describing the sequence of events that influenced the rendering process, resources used by the rendering process and a version of the content representing the final state of the rendering process. The monitoring data collector 312 may extract data describing events that influenced the rendering process, e.g. in form of a list of recorded content mutations and resource loading events 314 and forward the event data to a timeline data generator 316 of a render process visualization module 315. In addition, the monitoring data collector 312 may extract a version of the content representing the final state of the rendering process and forward it 313 to a transition visualization data generator 318 of the render process visualization module 315.

The timeline data generator 316 processes received mutation and resource load data to identify points in time at which significant changes of the displayed content occurred. The timeline data generator may e.g. identify sequential mutations or resource load events for which the time between the events is below a certain threshold (e.g. 5 milliseconds, 1 millisecond, 0.5 milliseconds). Those events may be aggregated and represented by a single point in a timeline representing the rendering process. Also, timestamps of sequential mutations or resource load events only affecting a small portion of the displayed content (e.g. lower than 2% or 5%) may be merged. Other mutations and resource loads are represented with an individual timestamp in the timeline data.

The created timeline data and the received mutation and resource load data are forwarded 317 to a transaction visualization data generator 318. The transaction visualization data generator uses the received final state of the content 313, timeline data 317 and mutation and resource load timing data to create variants of the content as displayed at different stages of the rendering process according to timestamps of the timeline data created by the timeline data generator. The transaction visualization data generator may start with the received final version of the content, create a copy of this content version, fetch the latest timestamp in the timeline and identify those resource loads and content mutations that happened at this timestamp. The identified resource loads and content mutations are then subtracted from the copy of the content version to create a content version as it was before the fetched timestamp. Resource loads may be subtracted by creating a content version in which the corresponding resource was not resolved, content mutations adding elements may be subtracted by removing the added elements, content mutations removing elements may be subtracted by adding the removed elements and content mutations changing attributes of content elements may be subtracted by setting the attribute to the value before the mutation.

After all identified resource loads and mutations are subtracted from the copied version of the content, it represents a version of the content as it was before the last timestamp of the render timeline. The transition visualization data generator may create a copy of the content corresponding to the last timestamp, fetch the next earlier timestamp and the resource loads and mutations corresponding to the next earlier timestamp and subtract those resource loads and mutations from the copied content version to create a content version as it was before the next earlier timestamp. This process may be continued until content versions for all timestamps in the render timeline are available.

The created content versions are forwarded to a dynamic elements remover 320, which disables all user interaction elements like links or forms and which also removes all scripts contained in the content. The created content versions may later be used to visualize the rendering process of the content using a conventional web browser. Those content versions should neither contain active user interaction elements nor dynamic elements that may perform undesired content modifications during e.g. a playback of the rendering process.

The content versions with removed dynamic elements are forwarded 321 to a resource reference manager 322 which adapts resource references to make them available from outside the browser 100 that originally loaded and rendered the content. Resources may in HTML documents be referred in an absolute or relative way. An absolute reference contains the full address of a reference whereas a relative reference identifies a resource within the context of the HTML document that contains the resource reference.

As an example, a content document "a" may be loaded from path "b/c" of server "d" and contain a resource "e" provided by server "d" in path "b/c/f". A relative reference in content "a" may identify resource "e" by the relative path "f/e". The browser combines this relative path with the identifier of server and path of the content to create an absolute reference.

The content versions created for the visualization of the rendering process are not serviced by the server that originally provided the content. Therefore, all relative resource references in those content versions are invalid and need to be replaced by corresponding absolute versions. This may be performed by searching for all relative resource paths (e.g. by searching for resource paths not starting with an identifier for a server. For HTML documents, this may be performed by searching for resource paths not starting with a protocol identifier like "http://" or "https://", as the protocol identifier precedes the identifier of a server and specifies the protocol that is used to communicate with the server). The identified relative resource paths may be converted into absolute resource paths by combining them with the identifier of server and path which were used by the monitored web browser 100 to request the content 111. The browser agent 120 may capture server identifier and path and send them as part of the browser monitoring data 308. After all relative resource references were converted into absolute references, a web browser is able to render the generated content versions independent from server and path from which they are loaded.

It is noteworthy that some resources may not be available for post-mortem replay and analysis. As an example, a user may first login to an application and view content while being logged in. This content may use resources that are only accessible for logged in users. During the replay of the rendering process, typically no login of a user occurs and therefore those resources are not available for the visualization of generated content versions during the replay. In such situations, the browser agent 120 may in addition to resource loading performance data also capture the resources themselves (e.g. data contained requested resources, like e.g. image bitmap data) and transfer those resources to the monitoring server e.g. as part of the browser monitoring data. As resource data may become large and transferring this data to the monitoring server may require considerable CPU, network and storage resources on both browser and monitoring server side, capturing and sending of resource data may only be performed by the browser agent when this is required.

After the resource reference manager created content versions that can be rendered outside the original web browser 100, those content versions are fetched by a viewing and replay module 324 which may be used to present the content versions in combination with a visualization of the timeline data generated by the timeline data generator. The viewing and replay module 324 may allow a user of the monitoring system to view versions of the content showing the state of the rendering process of the page arbitrary points in time of the timeline. An example screenshot of the render process visualization can be found in FIG. 12.

Referring now to FIG. 4 which provides flowcharts of the processes performed during setup of the browser agent 120.

FIG. 4a describes the initialization of the browser agent, including the setup of content modification detection and detection of the finalization of static content processing and FIG. 4b describes the processing performed to detect the end of dynamic content modifications as e.g. caused by the executions of script elements 113 embedded in loaded content by the web browser 100.

The browser agent initialization process starts with step 400 when new content that is instrumented with a browser agent is received by the browser. The browser loads and initializes the browser agent, typically before other activities are started by the browser to process the new content. Following step 401 initializes and configures a notification mechanism for browser side, in-place modifications of content. Configuring the notification mechanism typically includes which types of modification should be reported by the notification mechanism. Those modification types may contain adding of content elements, removing of content elements or modifications of content elements. The desired quality of rendering data influences the required types of modifications that should be notified. For monitoring setups that only require data describing the render performance and the time until the rendered page was visually complete, notifications about added elements may be sufficient. For monitoring setups that also provide data that allows replaying the rendering process, also notifications about removed or changed content elements may be required. For HTML based content documents, the JavaScript MutationObserver API may be used as a notification mechanism for content modifications. A MutationObserver may be configured with an observation scope (see e.g. parameter "target" of type "Node" in method "MutationObserver.observe( )", which specifies the root DOM element of a DOM tree that should be monitored) and a notification filter (see e.g. parameter "options" of type "MutationObserverInit" of method "MutationObserver.observe( )"). The observation scope specifies which DOM elements should be observed (e.g. whole DOM tree or only subtree) and the notification filter specifies which mutations should be notified (adding/removal of elements, change of element parameters etc.). The MutationObserver may be configured to call a specific method or function on detected modifications, where the called method or function receives a parameter describing the detected modifications. The MutationObserver may be configured to execute functionality as conceptually described in FIG. 6 on a detected modification.

Step 401 may also store an action identifier for the browser side user interaction that caused the loading of the new content or a browser side, in-place modification of already loaded content in the content modification notification mechanism (e.g. for HTML based documents, the action identifier may be stored in a created MutationObserver instance). This action identifier identifies an individual user interaction, like a click on a button or a link on a specific content displayed by a specific browser. Each performance of the user interaction, even if it uses the same user interaction element creates a new, individual action identifier. The action identifier is also attached to browser-side performance monitoring data and may be used by the transaction context resolver 227 to determine matching end-to-end transaction trace data for received render performance data.

Following step 402 may start the content mutation observation e.g. by switching on or starting the content modification notification mechanism configured in step 401. For HTML based content documents, step 402 may execute the method "MutationObserver.observe( )" with an observation scope parameter covering the DOM of the whole content and with a notification filter for added elements in case only render performance data is required and with a notification filter for added/removed and modified elements in case also render process visualization data is required.

Afterwards, step 403 registers the browser agent as a listener for a notification of the end of the static rendering process. For HTML based content documents this may e.g. be performed by registering the browser agent for notification of the "onload" event on the content element representing the whole content (e.g. the <body> element). On notification of the "onload" event, the browser agent may set a flag indicating that the static content loading and rendering process is finished.

Subsequent step 404 starts the end of content mutation detection process which is described in FIG. 4b. The process then ends with step 405.

The end of content mutation detection process as shown in FIG. 4 starts with step 410. It is first started during the initialization of the browser agent with step 404 and is then cyclically executes with a "end of content mutation detection frequency", e.g. every 100 milliseconds, every 500 milliseconds or every second, until the last detected content mutation is longer ago than a specific mutation-free threshold (e.g. 2, 3 or 5 seconds).

The process continues with step 411 which checks if the static content loading and rendering process is already finished, e.g. by checking if the browser agent already received an "onload" notification. In case "onload" was not yet notified, the process continues with step 415 which schedules a next run of the end of content mutation detection process and the process ends with step 416. In case "onload" was notified, the process continues with step 412 which checks if the last recorded content mutation is older than a specific threshold. Content mutation notification processing as described in detail in FIG. 6 may in addition to data describing reported mutations also store the time at which the last reported mutation occurred. Step 412 may compare this time of the last mutation with the current time to determine if the last mutation is older than the mutation-free threshold. In case the last mutation is not older, the process continues with step 415. Otherwise, it can be assumed that no subsequent mutation can be expected and the process continues with step 413 which stops the cyclic end of content mutation check process. Following step 414 starts the render monitoring data gathering process which is described in detail in FIG. 7. The process then ends with step 416.

Steps 411 and 412 may in addition check if a specific timeout time (e.g. 20 or 30 seconds) has elapsed since the start of the end of content mutation detection process by step 404 and stop the end of content mutation detection process and execute steps 413 and 414 as it can be assumed that the rendering process is erroneous. In this case, rendering data up to the timeout time is reported which may be used to identify and fix the root cause for the erroneous rendering process.

Coming now to FIG. 5 which conceptually describes data records that may be used to store reported content mutations, store data describing resource load activities and records to transfer data describing the monitored rendering process from the browser agent to a monitoring server.

FIG. 5a shows a DOM mutation notification record 500 which may be used by a DOM mutation notification mechanism (e.g. a MutationObserver for HTML documents) to describe observed DOM modification. A DOM mutation notification record 500 may contain but is not limited to a mutation type field 501 specifying the type of the reported mutation (e.g. add/remove elements, change of values of attributes of elements), a DOM location data field 502 specifying the location of the modification in the DOM tree (e.g. parent element for added/removed elements, element on which an attribute value was changed for attribute value change notifications), a list of added DOM elements 503 (if the mutation added elements), a list of removed DOM elements 504 (if the mutation removed elements) and attribute mutation data field 505 (in case the reported mutation describes the change of an attribute value). An attribute mutation data field may contain but is not limited to a name 506 specifying the name of the attribute on which the value change occurred and a previous value field 507 containing the value of the attribute before the change.

A mutation data storage record 510 which may be used to store data describing all mutations caused by a specific user interaction is shown in FIG. 5b and may contain but is not limited to a last mutation time field 511 storing the time of the youngest observed content mutation, an identifier for the activity or user interaction that caused the recorded mutations 512 and a mutation list 513 containing mutation entries 514 that describe the recorded mutations. A mutation entry record 514 may contain but is not limited to a mutation time field 515 storing the time at which the mutation described by the mutation entry record occurred, an added nodes field 516 containing added nodes entries 520 that describe the elements that where added by the recorded mutation, a removed nodes field 517 containing removed node entries 530 that describes the elements that were removed by the recorded mutation and an attribute change data field 518 containing an attribute change record 540 that describes an attribute change caused by the recorded mutation.

Data describing removed nodes and attribute changes is only required for the generation of render process visualization data, therefore the removed nodes field 517 and the attribute change data field 518 are optional because they are not required if only render process performance monitoring data is created. The DOM mutation processor component 121 of a browser agent 120 may use a MutationObserver to receive DOM change notifications 109 and may contain and use a mutation data storage 510 to store the received mutation notification data.

An added node record 520 as shown in FIG. 5c may be used to store data describing DOM elements that were added to loaded content by a content mutation. An added node record 520 may contain but is not limited to a field 521 containing a reference to the corresponding added DOM element and an optional DOM node identifier field 522. The DOM reference field 521 may be used during the creation of the render process performance monitoring data to check if the visual representation of the referred DOM element intersects with the visible area of the browser. The DOM node identifier is only required for the creation of render process visualization data and is therefore optional. The DOM node identifier may be used to identify corresponding DOM mutation elements and elements in the final content during the processing of render process visualization data outside the browser 100 that performed the rendering process.

Data describing removed DOM elements may be stored in removed node records 530 as shown in FIG. 5d. A removed node record 530 may contain but is not limited to a field 531 containing a reference to the corresponding removed DOM element, a field 532 containing a reference to the parent DOM element of the removed DOM element and a DOM node identifier field 533 for the parent node of the removed DOM element. The parent DOM node identifier 533 may be used to find the element corresponding to the parent element of the removed element outside the web browser that performed the rendering process. DOM node identifier of the parent element may be used to reconstruct the position at which the element was removed during the processing of render process visualization data to reconstruct a content version containing the removed DOM elements, as it was before the removing mutation.

An attribute change record 540 as shown in FIG. 5e may be used to store data describing content mutations that changed the value of an attribute of a content element. An attribute change record 540 may contain but is not limited to a field containing a reference to the DOM element that containing the changed attribute value 541, a DOM node identifier 542 of the referred DOM element, a name field 543 containing the name of the attribute for which the value change occurred and a previous value field 544 storing the value of the attribute before the change.

DOM node identifier values 522, 533 and 542 may be set after the rendering process is finished and during the creation of monitoring data that is transferred to a monitoring node for storage and analysis. Elements of the final version of the content may be tagged with an identifier and the DOM node identifiers 522, 533 and 542 of corresponding added node records, removed node records and attribute change records are set to the same value as this identifier.

FIG. 5f depicts a resource data storage 550 which may be used to store data describing the performance of resource requests that were executed during the rendering process. A resource data storage may contain a list of resource entry records 551 and a resource entry record 551 may contain but is not limited to a visible field 552 determining if the loaded resource is visible in the content, a resource identifier field 553 that identifies the loaded resource, e.g. by the URL of the resource, and a resource load time 554 storing the time at which loading the resource by the browser was finished. Most current web browser versions provide a standardized interface to query resource request performance data. See e.g. the resource timing specification of the W3C consortium at https://www.w3.org/TR/resource-timing-1/.

A monitoring data transfer record 560 as shown in FIG. 5g may be used to transfer data describing a content rendering process from a browser agent to a monitoring server. A monitoring data transfer record may contain but is not limited to a transaction context data field 561 which may e.g. contain the identifier for the user interaction or activity causing the render process described by the monitoring data record, an identifier for the web browser on which the rendering process occurred and an identifier for the content view on which the user interaction causing the rendering process was performed, a visually complete time field to store data describing the time when the rendering of the visible portion of the content was finished (either as duration or as point in time, or both), an optional render process performance data field 563 to transfer data describing the performance of the rendering process and an optional render process visualization data field 569 to transfer data required for the post-mortem visualization of the rendering process.

The transaction context data 561 may be used to uniquely identify the user interaction that caused the monitored render process, e.g. by an identifier for the browser on which the user interaction was performed, an identifier for the content view (i.e. timestamp describing the time at which the content was loaded by the browser) on which the user interaction was performed and an identifier of the performed user interaction (e.g. identifier for the user interaction element of the content used for the user interaction and a timestamp describing the time at which the user interaction was performed). A monitoring system that also monitors and traces end-to-end transactions from the browser side to the server side may use transaction context data of the same content and format to identify user interactions causing a traced transaction executions. Such a combined transaction performance and render process monitoring system may use transaction context data available at both monitoring data describing the transaction execution and monitoring data describing the rendering process to identify and correlate transaction execution and rendering monitoring data caused by the same user interaction. The transaction context resolver component 227 of the monitoring server variant 220 described in FIG. 2 may use transaction context data to correlate matching transaction execution performance monitoring and render process performance data.

A render process performance data field 563 may contain but is not limited to a visible content area data field 564 which contains data describing the visible area of the browser during the rendering process, e.g. in form of with and height of the browser window and optional a horizontal and vertical offset of the content area displayed in the browser window, and a visualization update data list 565 containing visualization update entries 566 describing timing and affected visualization area of recorded resource loading activities that affected the visible area of the browser window and of content mutations that added elements to the content and that affected the visible area of the browser window.

A visualization update entry 566 may contain but is not limited to a position and size field 567 describing the portion of the browser display area that was affected by the mutation or resource load and an update time field 568 describing the time at which the resource load or mutation occurred.

The rendering process visualization data field 569 may contain but is not limited to a mutation list 570 containing mutation entries 571 that describe all content mutations that occurred during the rendering process, a resource list 576 containing resource entries 551 that describe all resources that were loaded by the browser during the render process and a content document after mutations field 577 that contains a version of the content on which all mutations performed during the rendering process are applied. The replay of the rendering process, e.g. on a monitoring server may also require data describing the visible area of the browser, as already available in the visible content area data field 564 of the rendering process performance data. In case both render process performance data and render process visualization data 569 are created, the interpretation of render process visualization data 569 may reuse the browser visible area description data of the rendering process performance data. Otherwise, the content document after mutations field 577 may be augmented with data describing the visible area of the web browser during the rendering process.

A mutation list entry 571 may contain but is not limited to a mutation type entry 572 describing the type of the recorded mutation, e.g. as add, remove or change of a content element, a DOM location data field 573 describing the location of the mutation within the DOM representation of the content, e.g. in form of DOM node identifiers for added or modified nodes and a parent DOM node identifier for removed nodes, a mutation detail data field 574 containing data describing the performed mutation that cannot be reconstructed from a content version containing all mutations (as e.g. stored in the content document after mutations field 577), like for mutations that removed elements data describing the removed elements or for mutations that changed attribute values, the value of the changed attribute before the change. A mutation list entry 571 may, in addition, contain a mutation time field 575 specifying the time at which the mutation described by the mutation list entry occurred.

Referring now to FIG. 6 which describes the processing of a received content mutation notification as e.g. performed by DOM mutation processor 121. The process starts with step 600 when the DOM mutation processor receives a new mutation notification 500 containing data describing an occurred content mutation. Following step 601 sets the last mutation time 511 of the mutation data storage 510 maintained by the by DOM mutation processor 121 to the current time and subsequent step 602 creates a new mutation entry 614 for the received mutation notification and sets the mutation time 515 of the mutation entry to the current time. Afterwards, step 603 fetches the list of added elements 503 from the received mutation notification 500, creates corresponding added node entries 520 and stores them in the added node list 516 of the created mutation entry. Only the field reference to corresponding DOM element 521 of the created added node records 520 may be set by step 603. The DOM node identifier field 522 may be set afterwards by the mutation data gathering process described in FIG. 7.

Following decision step 604 checks if render process visualization data is required and in case no rendering process visualization data is required, continues with step 608 which stores the created mutation entry in the mutation list 513 of the mutation data storage 510. The process then ends with step 609.

A user of the monitoring system may decide if render process visualization is required. The monitoring system may create corresponding configuration data for browser agents, and step 604 may use this configuration data to determine if render process visualization data is required.

In case step 604 determines that render process visualization data is required, the process continues with step 605 which fetches the DOM element affected by the notified mutation from the DOM location data field 502 of the received mutation notification 500. For mutations adding elements to the DOM data structure, the affected DOM element is the added element, for mutations removing elements, the affected DOM element is the parent DOM element of the removed element and for mutations changing attribute values of DOM elements, the affected DOM element is the element on which the attribute change occurred.

Following step 606 fetches the removed DOM elements from the list of removed DOM elements 504 of the received DOM mutation notification and creates a removed node record 530 for each removed DOM element. The reference to the corresponding DOM element field 531 is set to a reference of a removed DOM element and the reference to the parent of the corresponding DOM element is set to a reference to the affected DOM element identified by step 605. The created removed node records 530 are added to the removed nodes list 517 of the created mutation entry.

Subsequent 607 fetches the attribute mutation data record 505 from the received notification and creates a corresponding attribute change node record 540, where a reference to the affected DOM element fetched by step 605 is stored to the field reference to containing DOM element 541 and name 543 and previous value 544 are set to the corresponding fields of the fetched attribute mutation data record 505. The created attribute change record 540 is stored in the attribute change data field 518 of the created mutation entry. Following step 608 stores the created mutation entry in the mutation list 513 of the mutation data storage 510 and the process then ends with step 609.

The process of compiling render process visualization and performance data by the browser agent after the rendering process is finished is shown in FIG. 7.

The process starts with step 700 when the browser agent detects that the rendering process is finished. Detection the finalization of the rendering process may be based on multiple observations, including a detection that the time since the last content mutation exceeds a specific threshold in combination with a notification that the static content rendering process is finished (e.g. "onload" notification) or a detection that the user performed an interaction with the content that e.g. caused a separate content mutation or the unload of the currently loaded content.

The browser agent may instrument all user interaction elements of the content, like link, button or form elements with sensors that notify the agent when such an interaction element is activated (e.g. link is followed, button pressed or data entered to a form field). A user interaction with the content indicates that the current representation of the content is sufficient for the needs of the interacting user. Therefore, a first recorded user interaction with the content may be interpreted as the end of the rendering process and may be used trigger the process to gather render monitoring data as described in FIG. 7. Some alternative embodiments may only record the time of the first user interaction and continue with monitoring content mutations until a specific time since the last content mutation has elapsed.

A detected unload of the content while content mutation monitoring is ongoing (e.g. process displayed in FIG. 4b did not yet trigger process displayed in FIG. 7) may always trigger a process to gather and send monitoring data (i.e. process displayed in FIG. 7) before the unload is performed, as unloading the content discards the browser agent and all monitoring data. It is therefore desired that the browser agent sends all gathered monitoring data before it gets unloaded. For HTML based content documents, the browser agent may be registered for notifications of "onunload" events which are notified when an unload of the current content is requested but before the unload is performed.

The process to gather monitoring data process continues with step 701, which stops the content mutation monitoring. For HTML bases content documents, this may be performed by a call of the method "disconnect( )" of the MutationObserver instance created in step 401 of the process described in FIG. 4a. This causes the MutationObserver to stop reporting subsequent content mutations.

Following step 702 creates a monitoring data transfer record 560, fetches transaction context data and stores it in the created monitoring data transfer record. The transaction context data may be provided by portions of the browser agent (not shown) that monitor user interactions with the content and create tracing and monitoring data triggered by those user interactions. The mutation causing activity identifier 511 stored in the mutation data storage may be part of this transaction context data.

Afterwards, step 703 fetches data describing resources requested by the browser to render the current content (e.g. images) and resource loading performance data describing the time when resource requests where issued by the browser and when corresponding responses containing the requested resources were received by the browser. Step 703 may iterate over all resources, extract an identifier uniquely identifying the resource (e.g. the URL used to load the resource), determine the point in time when the resource was received by the browser using the resource loading performance data and create a corresponding resource entry 551 using the fetched identifier as resource identifier 553 and the determined load time as resource load time 554 of the created resource entry. Resource entries may be stored in a resource data storage for later usage in subsequent steps of the process. The visible field 552 may be set using the size parameters like width or height of a corresponding resource entry. A width or height of 0 indicates a resource that occupies no space in the visual representation of the content and the visible field 552 of corresponding resource entries may be set to a value indicating an invisible resource.

Some alternative embodiments may further use the existence of resource loading performance data for requested resources as an indicator if the requested resource was successfully loaded by the browser. Those alternative embodiments may use resource entries with an additional field storing a load success status of the corresponding response and interpret missing resource loading performance data as an indicator for a failed resource request. Those embodiments may in case of missing resource loading performance data set the load success status of the corresponding resource entry to a value indicating a failed resource load. The success status may in addition to other monitoring data be transferred to a monitoring server for visualization, storage, and analysis.

Following step 704 identifies and selects those resources that affected the visible content area, i.e. resources that cover an area of the rendered content that intersects with the area of the content that is visible in the display window of the web browser. A detailed description of this selection process is shown in FIG. 8a. Subsequent step 705 fetches the previously recorded content mutations, i.e. the mutation entries 514 stored in the mutation list 513 of the mutation data storage 510 and subsequent step 706 selects those mutations that added elements to the content and that affected the visible content area, i.e. those adding mutations that changed an area of the content that intersects with the display window of the web browser. In addition, step 706 may filter out those mutations that only added a resource load directive to the content (e.g. a "<img/>" tag for HTML documents), as changes caused by such mutations are already covered by the resource load monitoring data fetched in step 704. The selection process performed by step 706 is described in detail in FIG. 8b.

Following step 707 uses the timing data of recorded resource load and content mutation activities that affected the visible area of the content, as selected by steps 704 and 706, to determine the latest point in time at which a resource load or a content mutation changed a portion of the content that intersects with the visible browser window. Step 707 may e.g. determine the latest point in time specified by any one of the mutation time 515 of the mutation entries 514 selected by step 706 or of the resource load time 554 of the resource entries 551 selected by step 704 as the point in time when the rendering process of the content was perceived as finished by a viewer of the web page. The determined time may be stored in the visually complete time field 562 of the monitoring data transfer record 560 created by step 702.

Subsequent decision step 708 determines if the browser agent is configured to also create detailed render process performance data. In case no detailed render process performance data is required, the process continues with step 710. Otherwise, step 709 is executed which fetches data describing time, size and position of all resource loading activities and content adding mutations affecting the visible browser area. Step 709 may e.g. use resource load and adding mutation data selected by steps 704 and 706 and fetch timing data and data describing the position and size of the portion of the visual representation of the content that was affected by those resource load and content mutation activities.

Typically, the DOM representation of content elements also contains data describing the visible area corresponding to those content elements. For HTML based documents, the corresponding DOM representation provides a "getBoundingClientRect( )" function that returns data describing position and size of a rectangle describing the visualization data covered by the element. The received position data may be adjusted by data describing a current scroll state of the browser window (e.g. members "Window.pageXOffset" and "Window.pageYOffset" of the DOM element representing the display window for HTML based content), and the size data may be adjusted by data describing a border visualization of the element (e.g. "Element.clientTop", "Element.clientLeft", "Element.clientHeight", "Element.clientWidth" for HTML elements). Step 709 may create a visualization update entry 566 for each processed mutation and resource load and store corresponding timing data of the mutation or resource load in the update time field 568 and corresponding position and size data in the position and size field 567 of the created visualization update entry 566. The created visualization update entries may be stored in the visualization update data list 565 of the created monitoring data transfer record.

Afterwards, decision step 710 is executed which determines if the browser agent is configured to provide render process visualization data. In case no visualization data is required, the process continues with step 716 which sends the created monitoring data transfer record 560 to a monitoring data receiver like a monitoring server and the process afterwards ends with step 717. Otherwise, step 711 is executed which fetches data describing all recorded mutations (e.g. all mutation entries 514 stored in the mutation data storage 510) and all resource loads (e.g. all resource entries 551 stored in the resource data storage).

Following step 712 sets document node identifier data to all DOM elements of the content. This may be performed by iterating over all DOM elements of the content and adding a new attribute with a unique name, like agent DOM identifier and assigning this new attribute a unique value for each DOM element. Afterwards, step 712 may iterate over all added node records 520 in all mutation entries 515 and use the reference to corresponding DOM element 521 to resolve the value of the new agent DOM identifier attribute for the corresponding DOM element. The resolved value may be stored in the document node identifier field 522 of the corresponding added node record 520. Note that the reference to the corresponding DOM element refers to the same DOM element to which step 712 previously added an agent DOM identifier attribute with a unique value. Therefore, it is possible to access the value of the agent DOM identifier attribute also via the DOM element reference stored in field 521. Then, step 712 may iterate over removed node elements and use the reference to the parent of the corresponding DOM element stored in field 532 to resolve the value for the document node identifier of the parent 533. Afterwards, step 712 may iterate over all attribute change nodes and resolve the value for their document node identifier of containing node field 542 using their reference to containing DOM element stored in field 541. After step 712 is executed, each DOM element of the content has a new attribute with a unique value identifying the DOM element and each record describing adding, removing or change of a DOM element due to a content mutation also has an attribute value set that identifies the corresponding DOM element. Those corresponding identifiers of DOM elements and mutation data may be later used during the creation of data for the offline visualization of the rendering process to identify matching DOM elements and corresponding mutation data outside the context of the web browser that performed the rendering.

Following step 713 stores data describing timing and detail data of all mutations and data describing the timing of all resource loads in the rendering process visualization data section 569 of the monitoring data transfer record 560.

For each added node record 520 stored in a mutation entry 514, a corresponding mutation entry 570 may be created, its type field 572 may be set to a value indicating an added mutation, its DOM location data may be set to the value of the DOM node identifier 522, its mutation detail data 574 may remain empty, as all data describing an adding mutation is available in the final content version which may also be captured (e.g. by subsequent step 714) and its mutation time 575 may be set to the mutation time 515 of the mutation entry 514 containing the added node record 520.

Further, step 713 may iterate over all removed node records of all mutation entries 514 and create corresponding mutation entries 571 with a type 572 indicating a removing mutation, a DOM location data field 573 set to the document node identifier of the parent element 533 of the removed node record, a mutation time 574 set to the mutation time 515 of the mutation entry 514 containing the removed node record 530 and with a mutation detail data 574 describing the content of the removed node. For HTML based documents, the content of a DOM element may be fetched using one of the attributes "outerHtml" or "textContent". Those attributes contain a textual (HTML) representation of the DOM element, which may be stored in the mutation detail data field 574.

Then, step 713 may iterate over all attribute change records and create corresponding mutation entries 571 with a type 572 identifying a mutation that changed an attribute value of an element. The DOM location data may be set to the value of document node identifier of the containing node 542, the mutation detail data 574 may be set to identify the name of the changed attribute and the value of the attribute before the change as stored in fields 543 and 544 of the attribute change record. The mutation time 575 may be set to the mutation time 515 of the mutation entry 514 containing the attribute change record. All mutation entries 571 created by step 713 are stored in the mutation list 570 of the rendering process visualization data 569.

Further, step 713 may store all resource entries 551 stored in the resource data storage 550 in the resource list 576 of the rendering process visualization data 569.

Afterwards, step 714 is executed which stores a version of the content document representing the state of the content after finished static and dynamic rendering in the content document after mutations field 577 of the render process visualization data. The content document may for HTML based documents be created using the attribute "innerHTML" on the DOM element representing the whole document, which provides a (HTML) text representation of the whole content. Note that all DOM elements of the content contain the new agent DOM identifier attribute added by step 712. Therefore, also the textual representation of the DOM elements contains those new attributes and their values.

Following optional step 715 captures resource data like image bitmaps etc. if this is required for the render process visualization. The accessibility of some resources loaded by a web page may only be available depending on certain context conditions, like a login status of a user viewing the web page. For situations in which resource data is not available outside of the rendering context, the browser agent may in addition to an identifier and a load time of requested resources, capture actual resource data and store it in corresponding resource entries of the resource list 576 of the rendering process visualization data section.

For image resources in HTML based documents, the browser agent may create a "canvas" element and configure it to contain a specific image resource. The image (bitmap) data of the image may then be accessed via the "getImageData( )" method of the "canvas" element and the fetched image data may be stored to the resource entry 551 corresponding to the image resource. Creating resource data may require considerable CPU and memory resources on the web browser and sending the resource data to a monitoring server may require considerable network capacities. Therefore, it is desired to only capture and send resource data if this is required. The browser agent may e.g. analyze the URL of resources to determine if those resources may only be available from the current browser context and only capture resource data if the URL analysis indicates that the resource is not available from outside the current context conditions.

Afterwards, step 716 is executed which sends the monitoring data transfer record 560 to a monitoring data receiver like a monitoring node 220 or 310. The process then ends with step 717.

Referring now to FIG. 8 which shows flowcharts describing the processes that identify resource load activities and content mutations that affected the visible display area of the browser. FIG. 8a describes the processing of resource load data and is executed for each resource that is loaded during the rendering process. The process starts with step 800 when a new resource candidate for a visibility check is received. Following step 801 calculates the display area of the received resource, e.g. by multiplying the width and height of the display area covered by the resource (width and height of the resource may be determined using the "getBoundingClientRect( )" functionality as described before for HTML based content). The calculated display area is compared with a minimum area threshold in step 802. Step 802 identifies those resources that are too small to have a significant influence on the rendering process. The threshold used by step 802 may be defined either as an absolute minimum number of pixels that need to be covered by a resource or as a minimum percentage of pixels relative to the number of pixels of the browser window.

In case the display area of the resource is smaller than the threshold, the process continues with step 809 which indicates a not visible resource and afterwards ends with step 810. If otherwise, the display area of the resource is larger than the threshold, the process continues with steps 803 and 804 which fetch and check if the visibility attributes of the resource indicate that the resource is not shown by the browser. For resources in HTML documents, step 803 may fetch the value of "style.display" property of the resource element and step 804 may check if this value is "none" which indicates a resource that is not considered during the rendering process. In case the visibility attributes indicate that the resource is not considered during the rendering process, the process continues with step 809 which indicates a not visible resource. Otherwise, the process continues with step 805 which fetches position and size data for the resource (again using the "getBoundingClientRect( )" functionality as described before for HTML content) and also fetches data describing the visible content area of the browser. For HTML based content, step 805 may fetch a "windowObj" which represents the current browser window, use its attributes "innerHeight" and "innerWidth" to determine the size of the visible browser area, and may further use its attributes "pageXOffset" and "pageYOffset" to determine the scroll position of the browser window.

The data describing the visible content area of the browser and the position and size of the content area covered by the resource both describe a rectangle at a position. Following step 806 determines if both rectangles intersect. If there is no intersection between the visible browser area and the display area of the resource, the process continues with step 809 and indicates a not visible resource. Otherwise, step 808 is executed which indicates a visible resource. The process then ends with step 810.

The process to determine whether a content mutation that added elements to the content affects the visible content area is shown in FIG. 8b. The process is executed for each recorded mutation that added elements to the content and starts with step 820 when an adding mutation is received for the visibility check. Following step 821 checks if the mutation only added a resource element (e.g. a "<img/>" element for HTML based content). The change of the display area that is caused by such mutations is already covered by the resource load monitoring data (as such mutations only add elements that only load and display resources) therefore, mutations that only add resource elements (and no other formatting elements) may be considered as not visible mutations. In case step 821 determines that the mutation only added a resource element, the process continues with step 830 which indicates that the mutation is not visible and the process afterwards ends with step 831.

If otherwise step 821 Otherwise, step 822 is executed which calculates the display area of the mutation, e.g. by calling "getBoundingClientRect( )" on the element added by the mutation for HTML based content, similar to step 801 in the process described in FIG. 8a. Afterwards, the display area is compared with a significance threshold in decision step 823. In case the calculated display area is smaller than the threshold, the process continues with step 830 to indicate a not visible mutation. Otherwise, step 824 and 825 are executed which fetch visibility attributes of the element added by the mutation and check if the visibility attributes indicate that the added element is visible (e.g. fetch the value of "style.display" of the added element and check if it is "none"). In case the visibility attributes indicate that an element was added that is not visible, the process continues with step 830 and indicates a not visible mutation.

Otherwise, step 826 is executed which fetches position and size of the element added by the mutation, followed by the execution of step 827 which calculates the visible content area of the browser and determines if the area covered by the element added by the mutation intersects with the browser visible area (same as steps 805 and 806 of process described in FIG. 8a). In case both areas intersect, the process continues with step 829 which indicates a visible content mutation. Otherwise, step 830 is executed indicating a not visible mutation. The process afterwards ends in both cases with step 831.

Coming now to FIG. 9 which describes the processing of render process performance data 563 by a monitoring data receiver like a monitoring node 220 or 310. The process starts with step 900, e.g. when rendering process performance data 563 is received by a render completeness time series data generator 225. Following step 901 sorts the visualization update entries 566 receives with the render process performance data 563 ascending by their update time 568. Following step 902 calculates for each update event the percentage of the visible browser area that is covered by the update event and all previous update events.

This may be performed by aggregating the area of the rectangle describing the area of the update event with the areas of the rectangles of the previous update events, and further determining the portion of the browser visible area that is covered by the aggregated areas and calculating the fraction of the covered area in relation to the complete browser visible area. The result of step 902 is a time series that describes the change of the portion of the visible browser area that was finished over time.

It is noteworthy that the same portion of the visible browser area may be altered multiple times during the rendering process. Step 902 may determine for each portion of the visible browser area the point in time of the latest change as relevant for the calculation of the finished portion of the visible browser area.

Following step 903 stores the created time series data, e.g. for later visualization. For examples see FIGS. 10a and 10b. Afterwards, step 904 calculates a performance index as a value that is proportional to the portion of the display area that is not completed over time. Step 904 may calculate the value for the mathematical integral of the time series calculated by step 902. This value is proportional to the portion of the display area that is completed over time.

To get a value that is proportional to the portion of the display area that is not completed over time, the previously calculated value that is proportional to the portion of the display area that is completed over time must be subtracted from a value representing the whole browser area over time (e.g. render time multiplied by whole browser display area or 100%). The process then ends with step 905.

The performance index value calculated by step 904 provides deeper insight into the performance of the rendering process than only the duration of the rendering process would provide. A lower performance index indicates a better performance of the rendering process.

The performance index value may also be calculated by first creating a function describing the change of the not finished percentage of the content over time and then calculating the value of the mathematical integral from the time at which the rendering process started (i.e. time of the user interaction that caused the rendering process, time of receipt of the first byte of the to be rendered content by the web browser, etc.) to the end time of the rendering process (i.e. visually complete time calculated by the browser agent).

It is noteworthy that the process described in FIG. 9 may also be executed by the browser agent and the browser agent may send calculated time series data and performance index or only the performance index to the monitoring server.

A description of the performance index by examples is shown in FIG. 10. Both FIGS. 10a and 10b describe the render completeness percentage time series data of a rendering process, e.g. as calculated by step 902 of the process described in FIG. 9. Both render processes are finished after the same time of about 4.5 seconds, see visually complete time 1000 and 1010. The rendering process described in FIG. 10a shows a relatively long time, until about 3.9 seconds, during which large areas of the content are not finished. After 3.9 seconds, a large portion of the display area is finished and at the visually complete time 1000 the whole content is finished. This describes a rendering process with relatively weak performance because large areas of the content area remain incomplete for a long time. Accordingly, also the area proportional to the performance index 1001 is large. Consequently, also the performance index is high, indicating a weak render performance.

FIG. 10b shows a constant, fast and early increase of the finished areas of the content area until about 2.5 seconds when nearly the complete visible area is finished and only a very small portion of the visible area remains unfinished until about 4.5 seconds. The chart shows that large areas of the content are finished fast and only a small fraction of the content remains unfinished. It may be reasonable to investigate and fix the reason for the still long time until the rendering process is finished, but the overall performance of the rendering process is good, which is also shown in a relatively small area corresponding to the performance index 1011, leading to a small performance index which indicates a good overall performance of the rendering process.

Coming now to FIG. 11 which describes the processing of render process visualization data e.g. by a rendering process visualization module 315 to create an interactive visualization of the different stages of the rendering process. The flowchart shown in FIG. 11a describes the overall processing of incoming render process visualization data 569 and FIG. 11b describes the interpretation of reported content visualization changes like resource loads and mutations to transfer a content version containing those changes into a content version not containing them.

The processing of render process visualization to create content variants for different states of the rendering process starts with step 1100 when new render process visualization data is available. Following step 1101 identifies times that represent significant changes of the visual presentation of the content during the rendering process. Step 1101 may fetch data describing resource loads required by the rendering process (e.g. resource entries 551 contained in the resource list 576 of the received render process visualization data record 569) and the mutations that added elements to the content during the rendering process (e.g. mutation entries 572 of the received mutation list 570 with a type 572 indicating a mutation that adds element to the content). Some variant embodiments may use all resource loads and adding mutations for the identification of times at which significant changes of the content representation occurred, while other variant embodiments may only use resource loads and adding mutations that intersect with the visible display area of the browser for this task.

The fetched resource loads and mutations may be sorted by the time of their occurrence (e.g. resource load time 554 and mutation time 575), and step 1101 may use those timestamps as candidates for significant change times. Further, step 1101 may identify clusters of change events that happened simultaneously or nearly simultaneously (e.g. difference of occurrence time falls below a certain threshold) and determine a significant change time that represents all change events of the cluster (e.g. latest time or average of change event in a detected cluster). Isolated change events (i.e. the difference between the occurrence time of the event and the next earlier and next later change event is higher than the threshold) may be represented with an individual change time.

Following step 1102 fetches the version of the content document with all applied mutations from the corresponding field of the received render process visualization data (e.g. field 577, content document after mutations) and prepares it for the usage in the render process visualization by disabling all user interaction elements (e.g. links, buttons, form elements) and by removing all scripts contained in the content document. Scripts and user interactions are removed because visualization of the rendering process may be performed with a standard web browser using the content document version with all applied mutations and other, derived content document versions. Scripts may perform undesired content mutations during the render process visualization and are therefore removed. User interaction elements like links may also cause undesired changes of the content (e.g. user of the monitoring system navigates to another page during the examination of the rendering process) and are therefore also disabled. In addition, step 1102 may fetch all resource data required by the rendering process, e.g. by fetching all resources referred by the resource identifier 553 of received resource entries.

As mentioned earlier, the received resource identifiers 553 may identify resources in a relative way, based on the identifier of the web page (or content document) containing the resources. Those relative resource identifiers are invalid outside the context of the containing web page and may be converted into absolute resource identifiers by step 1102 before the corresponding resource data is fetched by step 1102. As also mentioned earlier, resource data may only be available in the real user context (e.g. because a user need to login to be able to access a monitored web page and resources referenced by the web page), and the browser agent may capture and send resource data in addition to resource identifier 553 and resource load time 554 for each resource entry. In this case, step 1102 may make the resource data received with resource entries available for the later render process visualization.

Following step 1103 associates the latest significant change time detected by step 1101 with the prepared content version after all mutations because the latest significant timestamp detected by step 1101 represents the point in time when the rendering process was finished and the prepared content version after all mutations represents the state of the content after the finished rendering process.

Further, step 1103 selects the latest significant change time detected by step 1101 as current significant change time for the subsequent processing steps which use the prepared content version after all mutations as a baseline to create other content versions representing the state of visualization of the content document at earlier timestamps.

Following decision step 1104 checks if a next earlier significant change time is available, i.e. by checking if a significant change time is available that is earlier than the current significant change time. In case no earlier change time is available, the process continues with step 1110 which provides the significant change times determined by step 1101 with associated reconstructed and marked content versions created by steps 1105 to 1109. Each reconstructed and marked content versions represents the state of the rendering process at a specific significant change time. Corresponding reconstructed and marked content versions and significant change times are related. The process then ends with step 1111.

In case a next earlier change time is available, the youngest significant change time that is older than the current significant change time is selected as next earlier change time and step 1105 is executed which identifies all mutations and resource loads with an occurrence time (e.g. mutation time 575 or resource load time 554 of received mutation entries 570 and resource entries 551) that is later than the current significant change time.

Following step 1106 inversely applies all mutations and resource loads identified by step 1105 on the prepared content version after all mutations created by step 1102, to reconstruct a content version that represents the rendering state at the current significant change time.

Step 1106 may e.g. remove elements added by identified adding mutations, add elements removed by identified removing mutations or revert attribute value changes of identified attribute value changing mutations. The mutations and resource loads may be inversely applied by step 1106 in reverse order, starting with the mutation or resource load that occurred at the latest point in time and ending with the earliest. A more detailed description of step 1106 may be found in FIG. 11*b*.

Following step 1107 identifies all adding mutations and resource loads between the current significant change time and the next earlier significant change time. Those mutations and resource loads represent the visualization changes between the next earlier change time and the current significant change time.

Following step 1108 identifies the elements of the content document version created by step 1106 that correspond to the adding mutations and resource loads identified by step 1107. The identification of corresponding content elements and mutations may use the document node identifiers set by step 712 of the process described in FIG. 7 to data describing mutations that add elements (e.g. document node identifier 522 of added node records 520) to the content and to corresponding added content elements in the content document. The identification of corresponding resource loads and content elements using the loaded resource may use the resource identifier 553 of the loaded resources. The usage of the resource in the content document, e.g. in a Resource load element of the content document ("<img/>" element for elements loading image resources in HTML documents) use the resource identifier (i.e. the URL of the resource) to load the requested resource. Therefore, the resource identifiers are also available in content elements using resources.

Afterwards, step 1109 may mark those elements of the reconstructed content version representing the state of the rendering process at the current significant change time as created by step 1106 that were identified by step 1108 as elements that were added between the current and the next earlier significant change time. Marking those elements may e.g. be performed by adding formatting data to the identified elements that surrounds those elements with a frame of a specific type or color. Additionally, step 1109 sets the next earlier significant change time as current significant change time to proceed one step towards the beginning of the monitored rendering process. The process afterwards continues with step 1104 which determines a new next earlier significant change time based on the new current significant change time.

Coming now to FIG. 11*b* which describes the process that reverts content modifications reported by mutation entries and resource loads reported by resource entries on a content version containing those modifications and resource loads to create a content version as it was before those mutations and resource loads occurred.

The process starts with step 1120 when a content change which should be reverted on a content version containing the content change is received. Following decision step 1112 checks if the received change describes the finished loading of a requested resource, e.g. by checking if the received content change is described by a resource entry 551.

In case a resource load is described by the received content change, the process continues with step 1122, which may select elements of the content that refer to the loaded resource and changes those resource references to indicate a not yet loaded response. The resource references of the found content elements may be changed to refer a nonexistent resource, a blank image resource or an image resource displaying a broken image link.

The goal of step 1122 is to create a content that describes a situation in which the resource was not loaded. Changing the resource reference to a non-existing resource triggers browser and content side methods to handle missing image resources like e.g. displaying a browser specific icon for a not available resource and an alternative text specified in the content (see attribute "alt" of "<img/>" tags for HTML based content documents). Changing the resource reference to an existing resource that represents a not loaded resource would not trigger those methods. After step 1122 the process ends with step 1129.

In case step 1121 determines that the received content change describes no resource load, execution continues with decision step 1123 which checks if the received content change describes a content mutation that added elements to the content (i.e. by checking if the received content change is described by a mutation entry 571 with a mutation type 572 identifying an adding mutation). In case step 1123 identifies an adding mutation, the process continues with step 1124 which uses the document node identifier (e.g. 522) set to data describing adding mutations and to corresponding added content elements in the version of the content containing all mutations by step 712 of the process described in FIG. 7 to identify the content element that was added by the received adding mutation and then remove the identified content element from the content to create a version of the content as it was before the received adding mutation. The process afterwards ends with step 1129.

In case step 1223 determines that the received content change was not an adding mutation, the process continues with step 1125 which checks if the received content change describes an attribute changing mutation (e.g. by checking if the received content change is described by a mutation entry 571 with a mutation type 572 identifying an attribute changing mutation).

If an attribute changing mutation was detected, step 1126 is executed which uses the document node identifier in the data describing the mutation and in the content to identify the content element affected by the mutation. Afterwards, the name of the changed attribute and the value of the attribute before the change (e.g. as captured by step 607 of the process described in FIG. 6 and stored in field name 543 and field previous value 544 of an attribute change record 540) may be fetched to identify the attribute of the identified content element that was affected by the change and to change the value of the affected attribute to the value before the mutation. After step 1126, the process ends with step 1129.

When step 1125 determines that the received content change is no attribute changing mutation, the process continues with step 1127 which determines if the received content change describes a removing content mutation, e.g. by checking if the received content change is represented by a mutation record 571 with a mutation type 572 indicating a mutation that removed elements from the content. In case a content removing mutation was identified, step 1128 is executed which uses the document node identifiers stored in the mutation record and in the content data to identify the parent element of the elements removed by the received removing mutation.

Note: as the current version of the content document represents a state in which the element removing mutation was applied, the content document does not contain the removed content element, but it contains the content element that contained the removed content element, i.e. its parent element. Step 606 of the process described in FIG. 6 may have fetched references to the parent elements of elements removed by removing mutations and may have stored them in the parent reference field 532 of corresponding removed node elements. Step 712 of the process described in FIG. 7 may have created corresponding document node identifiers identifying the parent nodes of removed elements and may also have augmented the corresponding content elements with document node identifier data (i.e. an additional document node identifier attribute with a unique value).

After step 1128 identified the parent content element of the element removed by the removing mutation, step 1128 further reconstructs a content version as it was before the occurrence of the removing mutation by creating a content element representing the removed content element and adding it as child element to the previously identified parent element. To create a content element representing the removed content element, step 1128 may use a textual representation of the removed content element stored in mutation detail data 574 as created and stored by step 713 of the process described in FIG. 713. In case the identified parent element already contains one or more child elements and the sequence of child elements is relevant, additional data describing the position of the removed element amongst its sibling elements may be captured by step 712 of the process described in FIG. 7 and used by step 1128 to determine the correct position of the created element in the sequence of its sibling elements.

For HTML based documents, the mutation data provided by a "MutationObserver" contains fields "previousSibling" and "nextSibling", which contain references to the previous and next sibling of an element affected by a reported mutation. Those references may be used by the browser agent to create corresponding next/previous sibling document element identifiers which may later be used by step 1128 to determine the position of a removed element amongst its siblings.

Step 1128 uses data describing an element removing mutation to create a content version as it was before the removal by adding elements representing the removed elements to the content. As this adds elements to the content, those added elements may need to be prepared before they are added by removing scripts and disabling user interaction elements contained in the created elements, similar to the removal of scripts and disabling of user interaction elements in the content version containing all mutations by step 1102 of the process described in FIG. 11a. The process then ends with step 1129 after the execution of step 1128 or when step 1127 determined that the received content change is not a removing mutation.

Coming now to FIG. 12 which provides a screenshot of an exemplary visualization of a recorded render process. The visualization is subdivided into a timeline visualization bar 1202 which visualizes the significant change times identified (e.g. 1208, 1209, 1210 and 1211) by step 1101 of the process described in FIG. 11a in conjunction with other measured timing data like the navigation start time 1206 and the on load end time 1207, a content state summary bar 1205 showing summary data like then number of loaded images, the number of performed content update request (XHR) or the number of scripts contained in the content and a content visualization section 1201 that shows a version of the content that corresponds to a selected time (e.g. one of time 1206 to 1211). The significant time change corresponding to the visually complete time 1211 may be marked in the timeline visualization with a specific visualization type or color.

A user may directly select a specific time (1206 to 1211) in the timeline visualization bar 1202, or use the navigation buttons 1204 and 1203 to move from a selected time to the next earlier or later time and the content state summary bar 1205 and the content visualization section 1201 may be updated accordingly. The content state summary bar may be updated to show the number of images, content update request etc. as it was at the selected time in the timeline visualization bar 1202 and the content visualization section 1201 may be updated to show a version of the content as it was visible at the selected time. Content elements shown in the content visualization section that were added to the content between the currently selected time and the previous time (for the situation depicted in FIG. 12 the current time is 1210 and the previous time is 1209) are marked as new (e.g. dashed frame 1216 of element 1215) content elements.

The situation depicted in FIG. 12 shows a rendering process that was finished by an "onload" event 1213 which occurred 1885 ms after navigation start 1206. The determined visually complete time 1211 which is marked in the selected visualization as a solid circle is about one second earlier. The currently selected change time 1210 is at 696 ms after the navigation start time. At this point in time, a large portion of the visible area of the browser is already rendered and most required (image) resources 1215 and 1214 are already loaded. Resource 1215 is specially marked as a new loaded resource by a dashed frame 1216 because it was loaded between the currently selected change time 1210 and the previous change time 1209.

It is noteworthy that the visual content area data 564 received by a monitoring data transfer data record may be used by a visualization of the progress of the rendering process to reconstruct the browser display area situation (e.g. height and width of the browser window, content scroll state during the rendering process) as it was during the monitored rendering process.

Referring now to FIG. 13 which shows flowcharts of processes that may be used by variant embodiments that also monitor render processes that are caused by the browser side, in-place modification of already loaded content. Such in-place modifications may e.g. be caused by user interactions that trigger script-based data exchange (e.g. based on XHR requests/responses) between the web browser and the web server providing the currently displayed content, followed by an also script based browser side modification of the already loaded content according to data received from the web server.

FIG. 13*a* describes the processing of detected user interactions performed on the currently loaded content that cause a script controlled data exchange between browser and web server followed by a browser side modification of the already loaded content, without unloading the current content and replacing it with new content.

The browser agent 120 variant of those embodiments may in addition to monitoring the rendering process, instrument user interaction elements of the content and data exchange functionality with sensors that detect both user interactions and data exchange activity and accordingly notify the browser agent.

The processing of user interactions causing a data exchange with the web server which potentially causes a browser-side content update and a corresponding rendering process to display this content update starts with step 1300 when such a user action is detected by a sensor and notified to the browser agent. Following step 1301 initializes a mutation observer according to a mutation observation configuration (i.e. only adding mutations for monitoring only setups or all mutations for monitoring and render process visualization/replay setups) and stores an identifier for the triggering user interaction in the created mutation observer as described earlier (e.g. in step 401 of FIG. 4*a*). The identifier for the triggering user interaction may also be used for a parallel transaction tracing and monitoring system that traces the handling of the user interaction on the browser and server-side and creates corresponding end-to-end transaction trace data. The identifier for the triggering user interaction may later be used to correlate corresponding end-to-end transaction data and render process monitoring data. Following step 1302 starts content mutation observation by the mutation observer as also described earlier (e.g. in step 402 of FIG. 4*a*).

Subsequent step 1303 monitors the user interaction caused data exchange between a web browser and web server triggered and the following web browser side processing of data received from the web server, to determine a point in time when both data exchange and web browser side data processing are finished. To perform this data exchange and processing monitoring, step 1303 may increment a counter for each (XHR) request the web browser sends to the web server and decrement the counter after the finished processing of each received (XHR) response. The data exchange between a web browser and the web server is finished when the counter reaches value 0, which indicates that all responses for all requests (including responses for nested requests that were sent during the handling of an earlier received response) have been received and processed.

Following step 1304 is executed after the data exchange between browser and web server is finished and starts the end of mutation after user interaction detection process, which is described in FIG. 13*b*. The process then ends with step 1305.

Coming now to FIG. 13*b* which shows a flowchart of the process that detects the end of processing and content mutations caused by a user interaction, like a user interaction that previously triggered an execution of the process described in FIG. 13*a*. After the process was first triggered by step 1304 of the process described in FIG. 13*a*, it schedules itself for subsequent executions with an end of mutation after user interaction detection frequency, which may e.g. be every 0.5 seconds, every 0.1 seconds or every second. The process starts with step 1310 and continues with step 1311 which determines if the last mutation recorded by the mutation observer (which was created by step 1301 and started to observe content mutations with step 1302 of the process described in FIG. 13*a*) is longer ago than a specific threshold (e.g. 2 seconds or 3 seconds). As described earlier, processing received mutation notification data includes storing the time at which a mutation was received. This stored mutation time may be used by step 1311 to determine if the last mutation is older than the specific threshold. If the last mutation is not older than the threshold, processing continues with step 1313 which scheduled the next run of the process according to the end of mutations after user interaction detection frequency (e.g. in 0.1, 0.5 seconds or in one second). The process then ends with step 1314.

If otherwise step 1311 determines that the last recorded mutation is older than the threshold, processing continues with step 1312 which stops the end of user interaction processing detection (e.g. by not scheduling a next run of the process) and starts the user interaction variant of the monitoring data gathering process described in FIG. 13*d*. The process then ends with step 1314.

Coming now to FIG. 13*c* which shows the flowchart of a variant of a content mutation notification process for content mutations that are caused by user interactions that do not cause an unload of the current content and a load of other content but cause a browser side, in-place modification of the loaded content. The process starts with step 1320 when a content mutation notification is received by the mutation observer and continues with step 1321 which performs mutation processing as described in FIG. 6. Afterwards, step 1322 is executed which waits for a specific browser mutation resource processing time (e.g. 0.1 or 0.25 seconds). The reason for this waiting step is to assure that all resource loads that were added by the mutation are processed by the browser and are represented in the browser internal resource request monitoring system.

Afterwards, step 1323 identifies those resources that were added during the browser mutation resource process time, e.g. by fetching those resource loads from the resource request monitoring system with a request time that falls into the period of the browser mutation resource process time (i.e. the last 0.1 or 0.25 seconds). Following step 1324 adds the identified resources to a list of resource loads caused by the triggering user interaction (the user interaction that caused the execution of the process described in FIG. 13a). It is noteworthy that at the time of the triggering user interaction, the web browser may already have loaded several resources that were required to display the content as it was before the user interaction, and the user interaction may cause mutations of the content that in turn cause the loading of additional resources by the browser. The goal of step 1323 and 1324 is to separate those resource loads that are caused by the user interaction from resource loads that were performed before the user interaction. Variant embodiments may use the time of the occurrence of the user interaction to query the browser internal resource load monitoring system for resource loads that were initiated after the time of the user interaction and use the received resource loads as resource loads caused by the user interaction. The process then ends with step 1325.

Coming now to FIG. 13d which shows the flowchart of a process that may be used to transfer render process monitoring data of render processes that were caused by content mutating user interaction from a browser agent to a monitoring data receiver like a monitoring node 220 or 310.

The process starts with step 1330, either when an end of user interaction caused mutations was detected and all resource loads caused by those mutations are finished, or when the user performs another interaction with the web page or the web page is unloaded. Note that a finished resource load also include resource loads that failed e.g. because the requested resource was not available or could not be loaded in time.

Following step 1331 stops the mutation observation, e.g. as described in step 701 of the process described in FIG. 7 and subsequent step 1332 creates a monitoring data transfer record, fetches data describing the visible content area of the browser and transaction context data and stores the fetched data in corresponding fields of the created monitoring data transfer record, as already described in step 702 of the process described in FIG. 7.

Afterwards, step 1333 determines the latest time that a mutation or resource load caused by the user interaction changed the visible content area of the browser. Step 1333 is performed similarly to step 707 of the process described in FIG. 7, except that only resource loads may be analyzed that were caused by the user interaction (i.e. only resource loads that were added to the list of resources caused by the user interaction by step 1324 of the process described in FIG. 13c). Afterwards, step 1334 creates render process visualization data if this is required. Step 1334 subsumes the processing performed by steps 710 to 716 of the process described in FIG. 7, the only difference between those steps is that only mutations and resource loads caused by the triggering user interaction may be considered for the creation of the render process visualization data. Following step 1335 sends the created monitoring data transfer record to a monitoring data receiver like a monitoring node. The receiving monitoring node may use the received monitoring data for analysis and visualization purposes as described in FIGS. 9 to 12. Step 1335 also clears the mutation data storage and the list of resource loads caused by the user interaction which resets the monitoring data gathered by the browser agent which enables the browser agent to monitor the next user interaction. The process then ends with step 1336.

Coming now to FIG. 14 which depicts the situation of content subdivided into multiple, hierarchically organized frames. In HTML documents, the <iframe/> tag may be used to define such a frame that is embedded in its enclosing document. Each HTML document may contain an arbitrary number of <iframe/> elements, and each <iframe/> or "inline frame" element may in turn contain multiple <iframe/> elements.

An <iframe/> element is used to embed another HTML document in a current HTML document. Each of those embedded HTML documents is represented by a separate DOM data structure. Notifications about changes of a specific DOM are only propagated and visible within the specific DOM.

The top-level HTML document and the HTML documents embedded via <iframe/> elements, and their corresponding DOMs form a tree data structure where the top-level HTML and corresponding DOM represents the root node of the tree. The displaying browser typically provides functionality to access DOM data structures of parent or child frames. This enables browser agents deployed to DOM data structures of different frames to communicate with each other.

The visualization of those frames is hierarchically nested but not arbitrarily overlapping. In other words, frames A and B may occupy display space next to each other, but frame A may not overlap with frame B. Frame B may contain a frame C which is then nested (i.e. completely surrounded by another frame) frame B. It is not possible to define a frame that e.g. overlaps parts of frame A and parts of frame B.

FIG. 14a shows a situation with a browser 100 displaying content injected with a browser agent 120 in a top-level frame 1401. The content 111 contains sub frame A 1402a and sub frame B 1402b. Sub frame A contains embedded content 111a with injected browser agent 120a and sub frame B 1402b contains embedded content 111b with injected browser agent 120b. Sub frame B again contains sub frame C 1402c which displays content 111c with injected browser agent 120b. The browser agents 120, 120a, 120b and 120c monitor the rendering process of the contents they are deployed to (i.e. content 111, 111a, 111b and 111c) and send render performance data corresponding to the content they are deployed to, to a monitoring data receiver (138, 138a, 138b and 138c). Before the monitoring data is sent, the browser agents may perform parent agent communication 1403 to potentially correct local monitoring data. As an example, browser agent 120 may at a specific point in time recognize that the rendering of the content 111 it is deployed to is finished and calculate a visually complete time. However, at this point in time, rendering of sub frame 111a may not be finished. As sub frame 111a coves a portion of the visible area, the visually complete time of the whole content 111 should also consider the rendering activity of embedded frames. To correct the monitoring data, browser agent 120a may, on recognizing that rendering of content 111a is finished, send a message to the agent deployed to its parent frame 111 indicating that rendering of its local content is finished. The parent agent 111 may in response change its visual complete time to also represent the completion time of sub frame A.

In some variant embodiments, the browser agents 120, 120a, 120b and 120c may send their monitoring data to a monitoring data receiver independently, without prior communication to correct local monitoring data. In those embodiments, the correction may be performed by the monitoring data receiver.

FIG. 14b shows the tree data structure created by a top-level frame 1401 and its directly or indirectly embedded sub frames. Conceptually, each frame contains next to other elements, display size data 1411 which define the size of display area covered by the frame, and absolute 1412 or relative 1413 display position data. The top-level frame 1401 contains absolute display position data 1412 defining the position of the frame within the browser window. The embedded frames 1402a, 1402b and 1402c contain relative display position data defining the position of their display area relative to the origin of their parent frame. The combined relative display position data of a frame and all its parent frame up to the top-level frame may be used to calculate corresponding global screen coordinates for given frame-local coordinates. Each embedded frame (e.g. 1402a, 1402b or 1402c) is connected 1410 with its parent frame with a parent/child relation that is navigable in both directions. I.e. it is possible from within a frame to access its parent and child frames and their respective DOM data structures.

Coming now to FIG. 15 which describes the processing performed by browser agents to communicate visually completeness measurement data with browser agents deployed to their parent frames.

FIG. 15a describes the process performed by a browser agent to send visually completeness data to a browser agent deployed to the parent frame.

The process starts with step 1500 when visually completeness is detected in the local frame of the browser agent. Following decision step 1501 determines if a parent frame is available, i.e. if the current frame is not the top-level frame. In case a parent frame is available, the locally measured visually complete time is sent to the browser agent deployed to the parent frame in step 1502. Afterwards, the process ends with step 1503.

FIG. 15b describes the processing of a receipt visually complete notification containing a visually complete time by a browser agent. The process starts with step 1510 when such a notification is received by a browser agent. Following decision step 1511 checks whether visual completeness was already detected by the receiving browser agent for the frame it is deployed to. In case local visual completeness was not yet detected, the received notification is discarded and the process ends with step 1514. Otherwise, decision step 1512 is executed which verifies whether the received visually complete time is later than the local visually complete time. In case the received visually complete time is not later, the process ends with step 1514.

Otherwise, the received visually complete time is used instead of the local one as it indicates that the rendering of a nested sub frame was finished after the rendering of the local frame. Consequently, the visually complete time of the complete area represented by the current frame (including the areas represented by its embedded frames) must be at least as late as the received visually complete time. The process then ends with step 1514.

Referring now to FIG. 16 which describes a variant embodiment that in addition to monitoring the render process of specific content by a web browser, also marks resources used for the render process that were relevant for the rendering of the visible portion of the content. In addition, this variant embodiment may also mark the resource corresponding to the last update of the visible content before visible completeness was detected.

FIG. 16a shows an extended version 1610 of a resource entry 551 that contains additional storage for the performed marking and FIG. 16a describes the processing performed to mark the resource entries.

An extended resource entry 1600 may in addition contain a visually complete relevancy indicator 1601 and a last to visually complete indicator 1602 to mark resource entries corresponding to resources that were used during the rendering of the visible area and to mark the resource that was the last used resource before the visually complete condition was reached.

FIG. 16b describes a process that is performed when a DOM change that indicates an increase of the visually complete level was detected. This process may e.g. be triggered after step 808 of the process shown in FIG. 8a or after step 829 of the process shown in FIG. 8b.

The process starts with step 1610 when such a DOM change was detected and continues with step 1611 which fetches the resource entry 1610 describing the resource corresponding to the DOM change. Following step 1612 sets the visually complete relevancy indicator of the fetched resource to a value indicating that the described resource was relevant for the rendering of the visible area.

Afterwards, decision step 1613 determines whether with the current DOM change visually completeness was reached. Step 1613 may e.g. calculate the combined area covered by up to now notified DOM modifications and compare this combined area with the visible area. In case the combined area covers the whole visible area, visible completeness is reached.

In case step 1613 determines that visible completeness was reached, step 1614 is executed which sets the last resource to visible complete indicator of the fetched resource entry 1600 to a value indicating that the described resource was the last one used before visible completeness was reached.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring rendering of content by a web browser residing on a computing device, comprising:
    receiving, by a browser agent, a given notification pertaining to a document object model for the content rendered by the web browser, where the browser agent is injected into the content displayed by the web browser and the given notification includes one or more changes to the document object model;
    in response to receiving the given notification, processing, by the browser agent, the given notification by determining current time, extracting the one or more changes from the given notification, associating the current time with each of the one or more changes extracted from the given notification, and creating a mutation entry for each of the one or more changes, where the mutation entry includes data describing the change;
    detecting, by the browser agent, end of content processing by the web browser;
    in response to detecting the end of content processing, gathering process visualization data by
        assigning, by the browser agent, a unique identifier to each element of the document object model identified in the one or more changes;
        assigning, by the browser agent, a unique identifier to each mutation entry, where the unique identifier assigned to a given mutation entry is the same unique identifier that was assigned to the element of the document object model affected by the change described in the given mutation entry;
        capturing, by the browser agent, a text representation of the document object model, where the text representation includes unique identifiers that were assigned by the browser agent to corresponding element of the document object model; and
        adding, by the browser agent, the mutation entries and the text representation of the document object model to the data transfer record;
    sending the data transfer record by the browser agent over a network to a monitoring node, where the monitoring node resides on a server computer and the server computer is located remotely from the computing device; and
    rendering, by the monitoring node, the process visualization data on a display associated with the server computer by
    generating a first document object model from the text representation, where each element of the first document object model has a unique identifier;
    retrieving mutation entries from the data transfer record based on time at which the mutation described by the mutation entry occurred and in order from most recent to oldest; and
    for each mutation entry retrieved from the data transfer record, inversely applying a change described in a given mutation entry to a corresponding element of the first document object model in part by matching unique identifier assigned to the given mutation entry with the unique identifier assigned to the corresponding element of the first document object model, thereby yielding a second document object model.

2. The method of claim 1 wherein receiving the given notification further comprises registering with the web browser to receive notifications pertaining to the document object model.

3. The method of claim 1 wherein the one or more changes to the document object model are further defined as elements added to the document object model, elements removed from the document object model, and updates to values of attributes of elements in the document object model.

4. The method of claim 1 wherein detecting the end of content processing further comprises detecting a user interaction with the content rendered by the web browser, where the user interaction is interpreted as end of content processing.

5. The method of claim 1 wherein detecting the end of content processing further comprises
sending, by the browser agent, a message to a second browser agent, where the message includes a time content processing completed, the browser agent is deployed in a first frame and the second browser agent is deployed in a second frame having a parental relationship with the first frame;
receiving, by the second browser agent, the message from the browser agent; and
updating, by the second browser agent, a visually complete time maintained by the second browser agent with the time content processing completed when the time content processing completed is later than the visually complete time.

6. The method of claim 1 wherein detecting the end of content processing further comprises determining an amount of time since a change to the document object model, comparing the amount of time to a threshold, where the amount of time since the change to the document object model that is greater than the threshold is interpreted as the end of content processing.

7. The method of claim 1 wherein detecting the end of content processing further comprises registering with the web browser to receive an event indicative of an unload of the content.

8. The method of claim 1 further comprises
retrieving, by the browser agent, data describing resources used to render content currently rendered by the web browser;
determining, by the browser agent, transaction context data that identifies a transaction execution which caused the rendering of the content;
determining, by the browser agent, a most recent time at which a resource load or content mutation changed a visible portion of the content currently rendered by the web browser; and
creating, by the browser agent, the data transfer record, where the data transfer record includes the transaction context data, the data describing resources used to render the content and the most recent time at which the resource load or content mutation changed a portion of the content.

9. A computer-implemented method for monitoring rendering of content by a web browser residing on a computing device, comprising:
receiving, by a browser agent, a given notification pertaining to a document object model for the content rendered by the web browser, where the browser agent is injected into the content displayed by the web browser and the given notification includes one or more changes to the document object model;
in response to receiving the given notification, processing, by the browser agent, the given notification by determining current time, extracting the one or more changes from the given notification, associating the current time with each of the one or more changes extracted from the given notification, and creating a mutation entry for each of the one or more changes, where the mutation entry includes data describing the change;
detecting, by the browser agent, end of content processing by the web browser;
in response to detecting the end of content processing, gathering process visualization data by
assigning, by the browser agent, a unique identifier to each element of the document object model identified in the one or more changes;
assigning, by the browser agent, a unique identifier to each mutation entry, where the unique identifier assigned to a given mutation entry is the same unique identifier that was assigned to the element of the document object model affected by the change described in the given mutation entry;
capturing, by the browser agent, a text representation of the content, where the text representation includes unique identifiers for each element of the document object model; and
adding, by the browser agent, the mutation entries and the text representation of the content to the data transfer record; and
sending the data transfer record by the browser agent over a network to a monitoring node, where the monitoring node resides on a server computer and the server computer is located remotely from the computing device;
sorting, by the monitoring node, chronologically update events received in the data transfer record, where each update record specifies position and size of the display area affected by corresponding change to the document object model;
determining, by the monitoring node, a percentage of a visible content area having content that is rendered by the web browser at different time increments during rendering of content, where the percentage is based on the update events received in the data transfer record and defines a time series;
determining, by the monitoring node, a function that represents the time series;
computing, by the monitoring node, a mathematical integral of the function from a start of the rendering process to an end of the rendering process;
computing, by the monitoring node, a value for overall area by multiplying the visible content area by a render time; and
computing, by the monitoring node, a performance index by subtracting the mathematical integral from the value for the overall area.

10. The method of claim 9 wherein rendering of the process visualization data includes:
identifying times during rendering of the content at which significant changes occur in the rendered content;
setting current version of the content at most recent of the identified times as the text representation of the content;
for each identified time, identifying mutation entries and resource loads with a time later than the identified time;
for each identified time, inversely applying the identified mutation entries and resource loads to the current version of the content to yield a version of the content at the identified time;
for each identified time, storing the version of the content at the identified time, along with the identified time, for subsequent visualization; and
for each identified time, setting the current version of the content to the version of content at the identified time.

11. The method of claim 9 wherein rendering of the process visualization data includes:
maintaining a listing of resources used for the rendering process;

detecting that the given notification for the one or more changes to the document object model increases visual completeness of the content displayed by the web browser;

fetching a given resource entry for a given resource from the listing of resources, where the given resource entry corresponds to the one or more changes to the document object model; and setting an indicator in the given resource entry to a value indicating that the given resource is relevant to the content displayed by the web browser.

12. The method of claim 10 wherein the rendering of the process visualization further includes, for the version of the content at the identified time, identifying elements of the version of the content corresponding to the identified mutation entries using the unique identifiers assigned to the elements.

13. The method of claim 10 wherein rendering of the process visualization data further includes, for the version of the content at the identified time, identifying mutation entries and resource loads that are between the identified time and next earlier identified time of the content version; and marking the identified mutations and resource loads as changes of the content between the next earlier identified time and the identified time of the content version.

14. The method of claim 1 wherein the one or more changes to the document object model are caused by one of loading new content by the web browser or a user interaction with the content rendered by the web browser, such that the user interaction does not cause an unload of the content rendered by the web browser.

15. A system for monitoring content rendered by a web browser residing on a computing device, comprising:

a processor in the computing device;

a browser agent injected in the content displayed by the web browser and executed by the processor of the computing device, where the browser agent includes:

a DOM processor configured to receive a given notification pertaining to a document object model for the content rendered by the web browser and, in response to receiving the given notification, processing the given notification by determining current time, extracting the one or more changes from the given notification, associating the current time with each of the one or more changes extracted from the given notification, and creating a mutation entry for each of the one or more changes, where the mutation entry includes data describing the change;

an end-of-content detector configured to detect end of content processing by the web browser;

a data analyzer, in response to detecting the end of content processing, gathers process visualization data by assigning, by the browser agent, a unique identifier to each element of the document object model identified in the one or more changes;

assigning, by the browser agent, a unique identifier to each mutation entry, where the unique identifier assigned to a given mutation entry is the same unique identifier that was assigned to the element of the document object model affected by the change described in the given mutation entry;

capturing, by the browser agent, a text representation of the document object model, where the text representation includes unique identifiers for each element of the document object model; and adding, by the browser agent, the mutation entries and the text representation of the document object model to the data transfer record; and sends the data transfer record over a network to a monitoring node, where the monitoring node resides on a server computer and the server computer is located remotely from the computing device;

wherein the monitoring node renders the process visualization data by generating a first document object model from the text representation of the content, where each element of the first document object model has a unique identifier; retrieving mutation entries from the data transfer record based on time at which the mutation described by the mutation entry occurred and in order from most recent to oldest; and for each mutation entry retrieved from the data transfer record, inversely applying a change described in a given mutation entry to a corresponding element of the first document object model in part by matching unique identifier assigned to the given mutation entry with the unique identifier assigned to the corresponding element of the first document object model, thereby yielding a second document object model.

* * * * *